US006959017B2

(12) United States Patent  
Nakai et al.

(10) Patent No.: US 6,959,017 B2  
(45) Date of Patent: Oct. 25, 2005

(54) SYNCHRONIZING SYSTEM USING IEEE 1394 SERIAL BUS STANDARD

(75) Inventors: Satoru Nakai, Tokyo (JP); Kenji Suzuki, Tokyo (JP); Shinichiro Chino, Tokyo (JP); Yuusuke Ushio, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 856 days.

(21) Appl. No.: 09/858,555

(22) Filed: May 17, 2001

(65) Prior Publication Data

US 2002/0064185 A1   May 30, 2002

(30) Foreign Application Priority Data

Nov. 27, 2000   (JP) ............................. 2000-360279

(51) Int. Cl.⁷ .............................................. H04J 3/06
(52) U.S. Cl. ..................... 370/517; 370/503; 370/519
(58) Field of Search ................................ 370/503–520, 370/476, 545; 375/359; 702/176; 709/220; 710/40, 314; 713/400

(56) References Cited

U.S. PATENT DOCUMENTS

| 5,394,556 | A | | 2/1995 | Oprescu | 395/800 |
|---|---|---|---|---|---|
| 5,630,173 | A | | 5/1997 | Oprescu | 395/860 |
| 5,983,301 | A | * | 11/1999 | Baker et al. | 710/113 |
| 6,032,261 | A | | 2/2000 | Hulyalkar | |
| 6,041,286 | A | | 3/2000 | White | 702/176 |
| 6,128,318 | A | * | 10/2000 | Sato | 370/503 |
| 6,212,171 | B1 | * | 4/2001 | LaFollette et al. | 370/257 |
| 6,333,938 | B1 | * | 12/2001 | Baker | 370/503 |
| 6,339,601 | B1 | * | 1/2002 | Seong et al. | 370/503 |
| 6,389,502 | B1 | * | 5/2002 | Toguchi | 710/314 |
| 6,389,547 | B1 | * | 5/2002 | James et al. | 713/400 |
| 6,408,012 | B1 | * | 6/2002 | Sato | 370/545 |
| 6,408,355 | B1 | * | 6/2002 | Toguchi | 710/314 |
| 6,418,150 | B1 | * | 7/2002 | Staats | 370/503 |
| 6,477,181 | B1 | * | 11/2002 | Fujimori et al. | 370/476 |
| 6,505,255 | B1 | * | 1/2003 | Akatsu et al. | 709/239 |
| 6,570,945 | B1 | * | 5/2003 | Ono et al. | 375/359 |
| 6,621,832 | B2 | * | 9/2003 | Staats | 370/503 |
| 6,633,578 | B1 | * | 10/2003 | Matsumaru et al. | 370/419 |
| 6,633,989 | B1 | * | 10/2003 | Hollins | 713/400 |
| 6,721,818 | B1 | * | 4/2004 | Nakamura | 709/224 |
| 6,735,223 | B1 | * | 5/2004 | Woo et al. | 370/516 |
| 6,751,228 | B1 | * | 6/2004 | Okamura | 370/412 |

(Continued)

FOREIGN PATENT DOCUMENTS

DE   198 18 325   4/1998

(Continued)

OTHER PUBLICATIONS

"High Performance Serial Bus IEEE1394, 1995" Jul. 1997, pp. 29, 163, 164, 265-267.

(Continued)

Primary Examiner—Phirin Sam
(74) Attorney, Agent, or Firm—Leydig, Voit & Mayer, Ltd.

(57) ABSTRACT

Transmission delay in a serial bus connected network is determined by transmitting a Ping packet which is replied to in a physical layer of the bus from a request node to a response node, and measuring the time required from transmission of Ping packet by the request node until a Self_ID packet corresponding to the Ping packet is returned to the request node. The delay deviation between cycle timers of the request node and the response node is compensated by this transmission delay. The delay deviation may be also compensated using a time stamp.

14 Claims, 20 Drawing Sheets

U.S. PATENT DOCUMENTS

| | | | |
|---|---|---|---|
| 6,757,304 B1 * | 6/2004 | Nomura et al. | 370/516 |
| 6,763,402 B2 * | 7/2004 | Talati | 710/36 |
| 6,804,263 B1 * | 10/2004 | Okawa | 370/489 |
| 6,810,445 B1 * | 10/2004 | Sato et al. | 710/33 |
| 6,813,282 B1 * | 11/2004 | Domon | 370/516 |
| 2002/0041607 A1 * | 4/2002 | Spalink | 370/503 |
| 2002/0105977 A1 * | 8/2002 | Masunaga et al. | 370/519 |
| 2004/0057447 A1 * | 3/2004 | Fukunaga et al. | 370/412 |

FOREIGN PATENT DOCUMENTS

EP        1 047 213        10/2000

OTHER PUBLICATIONS

P1394a Draft Standard For A High Performance Serial Bus (Supplement),, Mar. 1998,.

* cited by examiner

SYNCHRONIZING SYSTEM USING IEEE 1394 SERIAL BUS STANDARD

FIELD OF THE INVENTION

The present invention in general relates to a synchronizing system using the IEEE1394 standard serial bus and measuring and compensating cycle timer delay among nodes in a system using the IEEE1394 standard data transmission in a network. More particularly, this invention relates to a synchronizing system using the IEEE1394 standard and measuring and compensating cycle timer delay between a controller and control object device when using the IEEE1394 standard in data transmission in a network, in a control system composed of one or more controllers and one or more control object devices, such as sensors and servo-drives.

BACKGROUND OF THE INVENTION

Hitherto, a communication method between a controller and a servo drive differed from one manufacturer to another. Recently, on the other hand, there is a mounting demand for "open products" also in the field of controllers for factory automation. As open controllers are spreading widely, designing of a user's original specification and utilization of general-purpose personal computer resources are realized, and connection between products of different manufacturers is easier, and the convenience for users is enhanced.

As an open interface between controller and servo drive, it is being considered to use the IEEE1394 or USB. In particular, it is widely attempted to apply the IEEE1394, the network standard for home automation, in the field of factory automation. Features of the IEEE1394 include the following.

(1) High speed data transmission of more than 100 Mbytes/sec is possible.

(2) Isochronous transmission system is possible, and synchronous communication having a fast communication period is realized.

(3) Connection or disconnection is possible without turning off the power source (live wire detaching, which is called "Plug and Play" or "Hot Plug").

(4) Up to 63 devices can be connected. Further, by mass production effects, it is expected to manufacture the interface section at lower cost. In addition, since the interface substrate is smaller than the Ethernet, it is easier to assemble into various devices.

FIG. 23 is a diagram showing a communication layer structure of the IEEE1394. In FIG. 23, the communication structure of the IEEE1394 comprises three layers, physical layer 101, link layer 102, and transaction layer 103, and also a serial bus management 104.

The physical layer 101 is a layer for processing signals between transmitted and received electric signals and the link layer. The physical layer 101 designates the mechanical interface such as connector and cable, encodes and decodes for analog and digital conversion of logic signals used in the link layer 102, designates the electrical interface such as signal level for determining the electrical level of communication signals, arbitrates for determining the communication code, re-synchronizes the communication lock, and detects initialization of the bus.

The link layer 102 is a layer for processing signals between the physical layer 101 and transaction layer 103. The link layer 102 allocates addresses, checks data, transmits and receives packets for dividing data into frames, and controls the cycle. Meanwhile, isochronous data is processed without passing through the transaction layer.

The transaction layer 103 is a layer for processing signals between the host application and the link layer 102. The transaction layer 103 reads and writes data. That is, the transaction layer 103, utilizing the processing of the link layer 102, transmits the request packet and receives the response packet, thereby processing one communication to the designated node and address. To the contrary, it also receives the request packet and transmits the response packet, thereby processing communication from another node to its own node.

The serial bus management 104 controls all three layers. In a typical communication layer structure, the physical layer 101 and link layer 102 are composed of hardware, and the transaction layer 103 and serial bus management 104 are composed of firmware.

Asynchronous communication according to IEEE1394 is used in asynchronous data communication. In asynchronous communication, secure transmission of a packet to the partner node is guaranteed, but the transmission delay time is not assured. The transmission node transmits the header information and actual data to the node at the destination, and the reception node returns an acknowledge packet to notify that the packet has been received.

Isochronous communication according to IEEE1394 is a kind of synchronous communication, and is suited to transmission of moving images and sound. In isochronous communication, it is guaranteed that data transmission is completed every 125 $\mu$sec. The transmission node of isochronous packet is not to transmit to a specific node, but to transmit to the entire bus by using channel numbers 0 to 63, and the reception node does not return an acknowledge packet. The header of the isochronous packet can identify the packet by using a 6-bit channel number, and therefore it is much simpler than the header of an asynchronous packet which uses a 64-bit address space, and the header information can be saved. The reception node selects and takes up the isochronous packet of the channel number desired to be received in the node. When the transmission node and reception node transmit and receive data using the same channel number, isochronous communication is established.

As shown in FIG. 24, isochronous communication and asynchronous communication can coexist. Of 125 $\mu$sec of one cycle, a maximum of 100 $\mu$sec can be used for isochronous communication, and the remainder is used for asynchronous communication. The maximum value of the data payload of an asynchronous packet is determined in order to avoid failure in guarantee of isochronous communication due to too long a transmission time of asynchronous data.

An isochronous transmission time zone is a band for isochronous communication, and an asynchronous transmission time zone is a band for asynchronous communication. As shown in FIG. 24, isochronous communication always starts ahead of asynchronous communication, so that isochronous communication can be guaranteed. In one cycle, after a CycleStart packet DS is transmitted, in FIG. 24, data packet D1 of channel CH1 and data packet D2 of channel CH3 are transmitted in the isochronous transmission time zone. Later, in the asynchronous transmission time zone, data packets D3, D4 are transmitted, but acknowledge packet DA is returned to these data packets D3, D4.

Of each node of IEEE1394, the link layer mounting a node having isochronous capability is provided with CYCLE_TIME register for synchronizing in clock with the bus, and has a timer for updating the content of this CYCLE_TIME register. This timer is called the cycle timer.

The time of the cycle timer is set by CycleStart packet. In the IEEE1394, the node for transmitting the CycleStart packet is called the cycle master, and other nodes than this cycle master are called cycle slaves.

That is, as shown in FIG. 25 and FIG. 26, by putting the time of cycle timers 112, 132 possessed by cycle masters 111, 131 on the CycleStart packet, and transmitting to the nodes (cycle slaves) 121, 141, 151, the time of the cycle timers 122, 142, 152 possessed by the nodes 121, 141, 151 is set in the same time as the cycle timers 112, 132 possessed by the cycle masters 111, 131.

Real-time data transmission using the IEEE1394 is transmitted by isochronous packet, but the data is synchronized at the transmission side and reception side by reference to the cycle timer. As a method of synchronization, for example, a time stamp is put in the isochronous packet.

Actually, however, there is a delay in transmission, and the cycle timers of the transmission side node and reception side node are not matched in time precisely. That is, at the moment when the time of the cycle timer is set by reception of the CycleStart packet at the response node, the time of the cycle timer of the request node is already advanced by the portion of the time gap, and due to transmission delay, the transmission side node and reception side node cannot be synchronized exactly.

In particular, considering the control system using the network connected by the IEEE1394, the controller and servo drive are synchronized by reference to these cycle timers. In the control system, however, high speed and high precision are required, especially high speed and high precision in synchronous control, and such timer delay between the controller and servo drive may cause serious effects on high speed and high precision of control, in particular, high speed and high speed of synchronous control.

SUMMARY OF THE INVENTION

It is an object of this invention to present a synchronizing system using IEEE1394 capable of compensating for the timer delay of the cycle timers of the transmission side node and reception side node, and realizing control of high speed and high precision, especially synchronous control of high speed and high precision, even when the IEEE1394 is used as an open interface between the controller and servo drive.

The synchronizing system using IEEE1394 of the invention is a synchronizing system using IEEE1394 for synchronizing among nodes in a network connected by using IEEE1394. The synchronizing system comprises a cycle timer delay measuring unit which measures mutual delay deviation amount of each cycle timer possessed by each node, and a cycle timer delay correcting unit which corrects mutual delay deviation of each cycle time on the basis of the delay deviation amount measured by the cycle timer delay measuring unit.

According to the invention, when synchronizing the nodes in the network connected by using the IEEE1394, the cycle timer delay measuring unit measures the delay deviation amount between the cycle timers of each node, and the cycle timer delay correcting unit corrects the deviation delay between the timers on the basis of the delay deviation amount measured by the cycle timer delay measuring unit.

Furthermore, in the above-mentioned synchronizing system using IEEE1394, the cycle timer delay measuring unit, when measuring the delay deviation amount between a request node and a response node, transmits a packet that can be responded by the response node in a physical layer from the request node to the response node, measures the required time from transmission of the packet by the request node until the packet returned by the physical layer of the response node corresponding to the packet is returned to the request node, and calculates the delay deviation amount by using the maximum value, minimum value, average or weighted average of the response time of the physical layer itself of the response node.

Thus, the cycle timer delay measuring unit, when measuring the delay deviation amount between a request node and a response node, transmits a packet that can be responded by the response node in a physical layer from the request node to the response node, measures the required time from transmission of the packet by the request node until the packet returned by the physical layer of the response node corresponding to the packet is returned to the request node, and calculates the delay deviation amount by using the maximum value, minimum value, average or weighted average of the response time of the physical layer itself of the response node.

Furthermore, in the above-mentioned synchronizing system using IEEE1394, the packet sent out from the request node to the response node is a Ping packet, and the packet returned from the response node to the request node is a Self_ID packet.

Thus, since the packet sent out from the request node to the response node is a Ping packet, and the packet returned from the response node to the request node is a Self_ID packet, the packet response is realized in the physical layer of the response node.

Furthermore, in the above-mentioned synchronizing system using IEEE1394, in which the packet sent out from the request node to the response node is a RemoteAccess packet, and the packet returned from the response node to the request node is a RemoteReply packet.

Since the packet sent out from the request node to the response node is a RemoteAccess packet, and the packet returned from the response node to the request node is a RemoteReply packet, the packet response is realized in the physical layer of the response node.

Furthermore, in the above-mentioned synchronizing system using IEEE1394, in which the packet sent out from the request node to the response node is a RemoteCommand packet, and the packet returned from the response node to the request node is a RemoteConfirm packet.

Since the packet sent out from the request node to the response node is a RemoteCommand packet, and the packet returned from the response node to the request node is a RemoteConfirm packet, the packet response is realized in the physical layer of the response node.

Furthermore, in the above-mentioned synchronizing system using IEEE1394, in which the cycle timer delay measuring unit transmits a Read packet from a request node to a response node, reads the cycle timer value of the response node, and when the request node receives a ReadResponse packet including this cycle timer value being read, calculates the delay deviation amount on the basis of the difference between the received cycle timer value and the cycle timer value of the request node.

Thus, the cycle timer delay measuring unit transmits a Read packet from a request node to a response node, reads the cycle timer value of the response node, and when the request node receives a ReadResponse packet including this cycle timer value being read, calculates the delay deviation amount on the basis of the difference between the received cycle timer value and the cycle timer value of the request node.

Furthermore, in the above-mentioned synchronizing system using IEEE1394, the request node includes a judging unit which judges if a series of sequence from transmission of the Read packet till return of the ReadResponse packet is completed or not within a same asynchronous transmission time zone which is the time zone of same asynchronous transmission, and when the judging unit judges to be completed within the same asynchronous transmission time zone, a Read packet is sent out to the response node.

Thus, the judging unit of the request node judges if a series of sequence from transmission of the Read packet till return of the ReadResponse packet is completed or not within a same asynchronous transmission time zone which is the time zone of same asynchronous transmission, and when the judging unit judges to be completed within the same asynchronous transmission time zone, a Read packet is sent out to the response node, so that the ReadResponse packet may be returned within the same asynchronous transmission time zone.

Furthermore, in the above-mentioned synchronizing system using IEEE1394, an upper layer of the response node includes a judging unit which judges whether or not an asynchronous transmission time zone which is a time zone of asynchronous transmission, and when the judging unit judges to be an asynchronous transmission time zone, the upper layer accumulates the ReadResponse packet in a transmission buffer.

Thus, the judging unit of the upper layer of the response node judges whether or not an asynchronous transmission time zone which is a time zone of asynchronous transmission, and when the judging unit judges to be an asynchronous transmission time zone, the upper layer accumulates the ReadResponse packet in a transmission buffer (TX_FIFO), so that the ReadResponse buffer may be immediately returned to the request node without staying long in the transmission buffer.

Furthermore, in the above-mentioned synchronizing system using IEEE1394, a link layer of the response node includes a writing unit which writes data into the packet immediately before sending out the packet, and just before the ReadResponse packet is sent out from the link layer buffer, the cycle time value of the corresponding response node is written into the ReadResponse packet by the writing unit.

Thus, the writing unit of the link layer of the response node writes the cycle time value of the corresponding response node into the ReadResponse packet just before the ReadResponse packet is sent out from the link layer buffer.

Furthermore, in the above-mentioned synchronizing system using IEEE1394, each node has a cycle timer delay memory which stores the delay deviation amount.

Thus, the cycle timer delay memory of each node stores the delay deviation amount, and acquires the delay deviation amount at least by access from other node.

Furthermore, in the above-mentioned synchronizing system using IEEE1394, in which the cycle timer delay memory stores the delay deviation amount among all nodes in a data table format.

Thus, the cycle timer delay memory stores the delay deviation amount among all nodes in a data table format.

Furthermore, in the above-mentioned synchronizing system using IEEE1394, in which the cycle timer delay memory is provided in the node as a cycle master.

Thus, the cycle timer delay memory is provided in the node as a cycle master.

Furthermore, the above-mentioned synchronizing system using IEEE1394 further comprises a network structure change judging unit which judges change in network structure, in which if the network structure change judging unit judges change in the network structure, after restructuring the network, the cycle timer delay measuring unit measures the mutual delay deviation amount of cycle timers, and the cycle timer delay correcting unit corrects the mutual delay deviation of cycle timers on the basis of this delay deviation amount.

Thus, if the network structure change judging unit judges change in the network structure, after restructuring the network, the cycle timer delay measuring unit measures the mutual delay deviation amount of cycle timers, and the cycle timer delay correcting unit corrects the mutual delay deviation of cycle timers on the basis of this delay deviation amount.

Furthermore, in the above-mentioned synchronizing system using IEEE1394, the network structure change judging unit is provided in the node as a cycle master.

Thus, the network structure change judging unit is provided in the node as a cycle master.

Furthermore, in the above-mentioned synchronizing system using IEEE1394, the cycle timer delay measuring unit and cycle timer delay correcting unit are provided in the specified node using the synchronism of nodes.

Thus, the cycle timer delay measuring unit and cycle timer delay correcting unit are provided in the specified node using the synchronism of nodes.

Furthermore, the above-mentioned synchronizing system using IEEE1394 further comprises a timer delay transmission unit which transmits the delay deviation amount, in which the node of the cycle master having the cycle timer as the reference for synchronism includes the cycle timer delay measuring unit and cycle timer delay transmission unit, the specified node other than the node of the cycle master includes the cycle timer delay correcting unit, and the node of the cycle master transmissions the delay deviation amount measured by the node to the specified node, or stores the delay deviation amount measured by the node in the data table, the specified node acquires the delay deviation amount from the node of the cycle master, and the delay deviation of the cycle timer is corrected on the basis of the delay deviation amount later transmitted to the specified node or the acquired delay deviation amount.

Thus, the node of the cycle master having the cycle timer as the reference for synchronism transmits the delay deviation amount measured by the node to the specified node by the cycle timer delay transmission unit, or stores the delay deviation amount measured by the node in the data table, the specified node acquires the delay deviation amount from the node of the cycle master, and the delay deviation of the cycle timer of the node is corrected on the basis of the delay deviation amount later transmitted to the specified node or the acquired delay deviation amount.

Furthermore, in the above-mentioned synchronizing system using IEEE1394, the cycle timer delay correcting unit sets the cycle timer value on the basis of the delay deviation amount when receiving the CycleStart packet.

Thus, the cycle timer delay correcting unit sets the cycle timer value on the basis of the delay deviation amount when receiving the CycleStart packet.

Furthermore, in the above-mentioned synchronizing system using IEEE1394, the cycle timer delay correcting unit corrects the delay deviation by using the delay deviation amount when the upper layer uses the cycle timer value.

Thus, the cycle timer delay correcting unit corrects the delay deviation by using the delay deviation amount when the upper layer uses the cycle timer value.

Furthermore, in the above-mentioned synchronizing system using IEEE1394, the specified node further includes a second cycle timer, and the cycle timer delay correcting unit sets the cycle timer value having corrected the delay deviation by using the delay deviation amount at an arbitrary timing, in the second cycle timer.

Thus, the cycle timer delay correcting unit of the specified node sets the cycle timer value having corrected the delay deviation by using the delay deviation amount at an arbitrary timing, in the second cycle timer.

Furthermore, in the above-mentioned synchronizing system using IEEE1394, the node of the cycle master has a time stamp generating unit which generates a time stamp, the specified node has a time stamp time monitoring unit which monitors the time indicated by the time stamp, the cycle timer delay correcting unit updates the time stamp value of the time stamp sent from the node of the cycle master on the basis of the delay deviation amount, and the time stamp time monitoring unit monitors the time indicated by the updated time stamp value.

Thus, the cycle timer delay correcting unit updates the time stamp value of the time stamp sent from the node of the cycle master on the basis of the delay deviation amount, and the time stamp time monitoring unit monitors the time indicated by the updated time stamp value.

Furthermore, in the above-mentioned synchronizing system using IEEE1394, the cycle timer delay measuring unit and cycle timer delay correcting unit are provided in the node as a cycle master.

Thus, the cycle timer delay measuring unit and cycle timer delay correcting unit are provided in the node as a cycle master.

Furthermore, the above-mentioned synchronizing system using IEEE1394 further comprises a cycle timer delay transmission unit which transmits the delay deviation amount, in which the node of the cycle master has the cycle timer delay correcting unit, the specified node other than the node of the cycle master includes the cycle timer delay measuring unit and cycle timer delay transmission unit, and the specified node transmissions the delay deviation amount measured by the specified node to the node of cycle master, or acquires the delay deviation amount from the specified node, and the delay deviation of the cycle master of the node of the cycle master is corrected on the basis of the delay deviation amount later transmitted to the specified node or the acquired delay deviation amount.

Thus, the specified node transmissions the delay deviation amount measured by the specified node to the node of cycle master, or acquires the delay deviation amount from the specified node, and the delay deviation of the cycle master of the node of the cycle master is corrected on the basis of the delay deviation amount later transmitted to the specified node or the acquired delay deviation amount.

Furthermore, in the above-mentioned synchronizing system using IEEE1394, the node of the cycle master has a time stamp generating unit which generates a time stamp, the specified node has a time stamp time monitoring unit which monitors the time indicated by the time stamp, and the cycle timer delay correcting unit updates the time stamp value of the time stamp generated by the time stamp generating unit on the basis of the delay deviation amount.

Thus, the cycle timer delay correcting unit updates the time stamp value of the time stamp generated by the time stamp generating unit of the node of the own cycle master on the basis of the delay deviation amount, and transmissions the data including this updated time stamp value to the specified node.

Furthermore, the above-mentioned synchronizing system using IEEE1394 is a control system composed of a servo drive device and a controller for controlling it.

Thus, the synchronizing system using IEEE1394 may be applied to a control system composed of a servo drive device and a controller for controlling it.

Furthermore, in the above-mentioned synchronizing system using IEEE1394, the controller is a cycle master.

Since the controller is used as the cycle master, the delay deviation amount can be measured and corrected efficiently.

Other objects and features of this invention will become apparent from the following description with reference to the accompanying drawings.

DESCRIPTION OF THE PREFERRED EMBODIMENTS

Preferred embodiments of a synchronizing system using IEEE1394 of the invention are described below with reference to the accompanying drawings.

Figure 24:
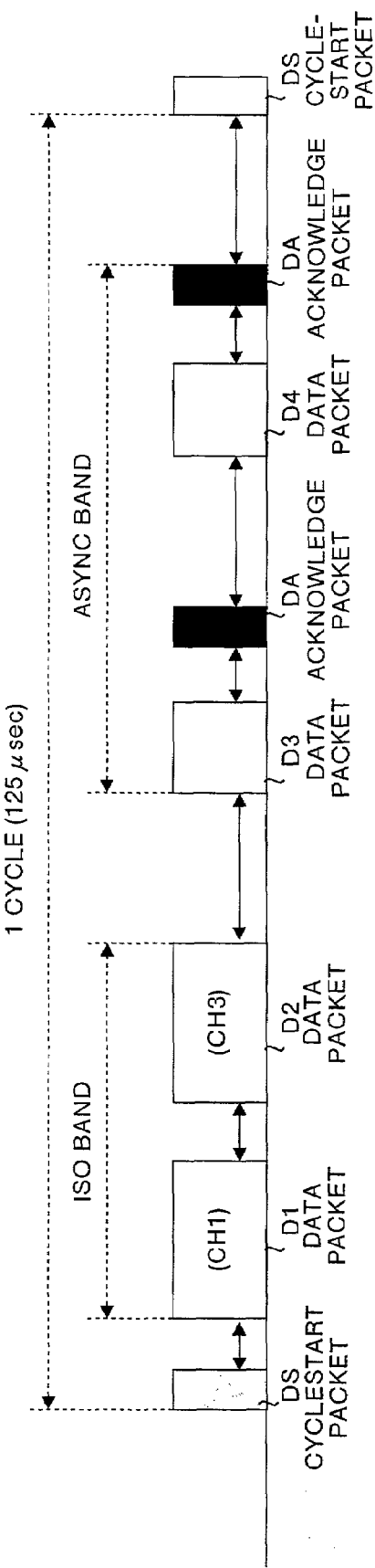
FIG. 24 is a diagram showing a coexisting example of isochronous communication and asynchronous communication.
Figure 25:
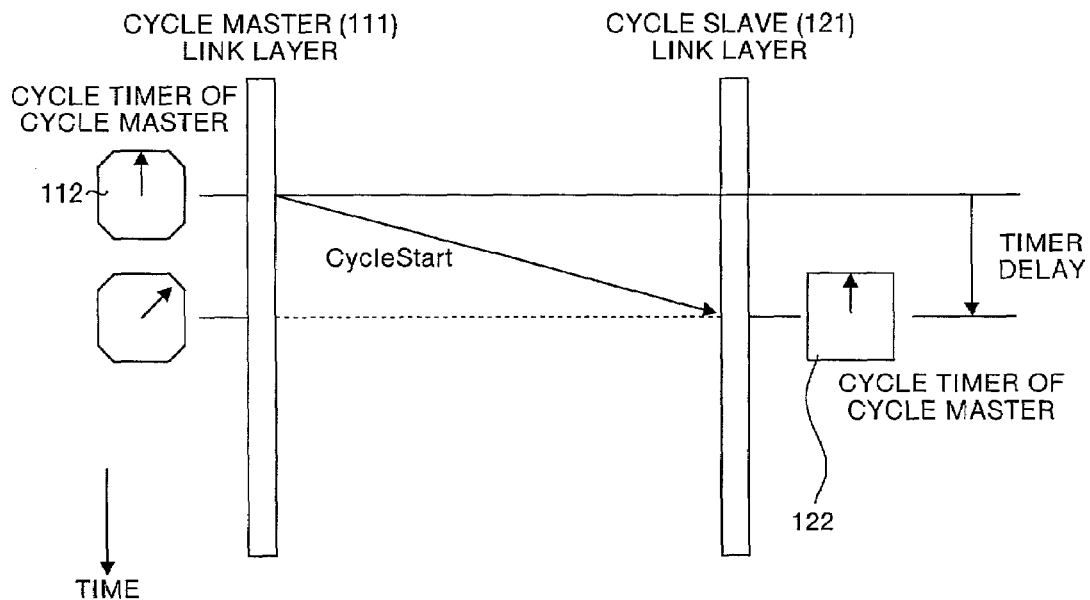
FIG. 25 is a sequence diagram showing a synchronous process between cycle master and cycle slave using a CycleStart packet.
Figure 26:
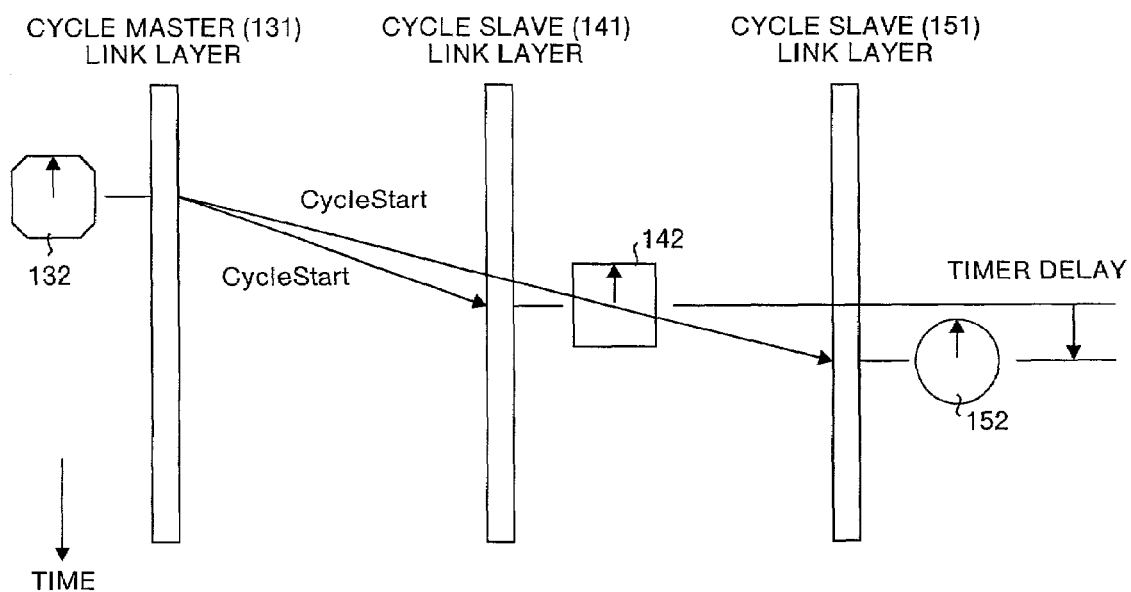
FIG. 26 is a sequence diagram showing timer synchronous process between cycle slaves using CycleStart packet.

First, a first embodiment of the invention is explained. In the first embodiment, the cycle timer delay is estimated and compensated by using Ping packet. In P1394a, in order to calculate and set the optimum Gap_Count value, a Ping packet is defined. The gap is, for example, the duration between data packets D2 and D3 shown in FIG. 24, that is, an idle time of the bus, and the longer the gap, the longer is the duration of idle bus, and the actual flowing time of the packet is limited, or when the gap is extremely shortened, communication may be disabled, due to composition of topology, if the number of hops of physical layer is large or if many nodes are connected, and hence the gap must be optimized.

In P1394a, when this Ping packet is transmitted from one node (bus manager) to other node, the physical layer of the node at the destination receiving this Ping packet is designed to return a Self_ID packet, and by measuring the time from transmission of Ping packet until the Self_ID packet is returned, the delay time between two nodes is known. As mentioned above, in P1394a, on the basis of the delay time, an optimum Gap_Count value can be calculated and set. Except for the root, all can respond to this Ping packet without link layer, and the delay time can be known by the repeater composed of physical layer only, and optimum Gap_Count value can be calculated if the topology is changed. This Ping packet is not included in the IEEE1394-1995 standard, but is being studied to be included in the P1394a standard.

Figure 1:
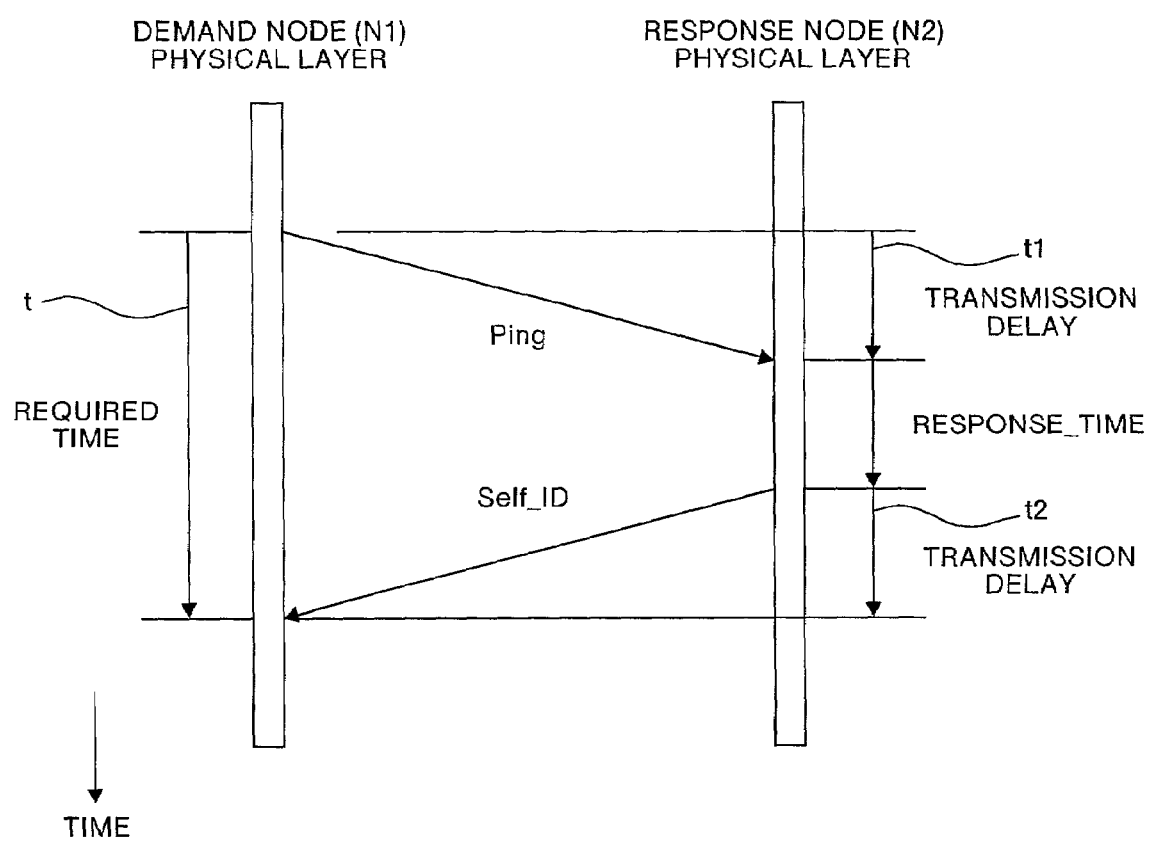
FIG. 1 is a diagram showing a processing sequence of transmission delay measurement in a synchronizing system using IEEE1394 in a first embodiment of the invention.

In the first embodiment, the cycle timer delay is estimated and compensated by using the Ping packet. Since the packet repeat circuit of physical layer of the IEEE1394 is symmetrical, as shown in FIG. 1, transmission delay t1 until the Ping packet sent from the physical layer of request node N1 reaches the physical layer of response node N2 is nearly equal to transmission delay t2 until the Self_ID packet returned from the physical layer of response node N2 reaches the physical layer of request node N1. That is, it is assumed that:

transmission delay $t1 \approx$ transmission delay $t2$.

As a result, as shown in FIG. 1, supposing the time from transmission of Ping packet from the physical layer of request node N1 until reception of Self_ID packet to be required time t, the transmission delay t1 is determined in the following equation:

$t1$ (transmission delay)$\approx$($t$(required time) $-$RESPONSE_TIME)/2.

This transmission delay t1 is regarded as the delay between the cycle timer held by request node N1 and cycle timer held by response node N2. The actual time taken in RESPONSE_TIME is not known in this technique, but the minimum value and maximum value of RESPONSE_TIME are specified by parameters (cable interface timing constants) and are hence known. Therefore, for example, RESPONSE_TIME may be determined in the equation:

RESPONSE_TIME$\approx$(maximum+minimum)/2.

If the approximate time of RESPONSE_TIME is experimentally known, instead of the average of maximum and minimum values, by using the coefficient w, for example, in the equation:

RESPONSE_TIME$\approx$($w \times$maximum$+(1-w) \times$minimum)/2.

RESPONSE_TIME may be determined at higher precision.

Moreover, instead of measuring the required time t until Self_ID packet is returned by transmitting Ping packet, the required time t may be obtained by transmitting Remote-Access packet and measuring the time until RemoteReply packet is returned or by transmitting RemoteCommand packet and measuring the time until RemoteConfirmation packet is returned. These packets behave almost alike, that is, the physical layer returns, and either packet may be used. In these packets, whether in cycle master or cycle slave, all nodes can arbitrarily transmit to the node, and the delay between arbitrary nodes can be measured by any other node as required.

Since the delay between nodes (timer delay) varies depending on nodes, and it is preferred to compensate for the timer delay in all nodes. However, when the timer delay is measured frequently, the number of packets for measuring timer delay is increased, and the network traffic increases, and transmission of important packets may be disturbed.

Since the timer delay is invariable as far as the network structure (topology) is unchanged, basically, the timer delay compensation is required only once after the network is structured (restructured), and therefore by detecting the network structure including restructuring of the network such as bus reset, and after the cycle timer is set by the cycle start packet, the packet for measuring the timer delay is pass only once at the beginning, and the timer delay is compensated.

For this purpose, only one node on the network, for example, the cycle master, or the controller in the case of control system must possess network structure change judging unit. The network structure change judging unit transmits a command for timer delay compensation to other node when the network judges restructuring. Or, the cycle master (or controller in the case of control system) should always possess the network structure change judging unit, and the timer delay is stored in the data table possessed by the cycle master itself, so that the series of operations relating to the timer delay may be entirely managed by the cycle master.

According to the first embodiment, within the range of the specification of IEEE1394 (existing specification of P1394a), by compensating for the timer delay of the cycle timer of each node, if the IEEE1394 is applied in an arbitrary use, synchronism of high precision can be realized. Further, when the IEEE1394 is used as an open interface between the controller and servo drive, the timer delay can be compensated between the controller and servo drive, or between servo drives, so that control of high speed and high precision may be realized. The packet used in the timer delay measurement cannot be used by the cycle master only, but since it can be used equally by all nodes, it is possible to measure the timer delay between arbitrary nodes.

Next, a second embodiment of the invention is explained. In the first embodiment, since the actual time of RESPONSE_TIME is unknown, the timer delay is approximately estimated, but in the second embodiment, the true and accurate timer delay can be measured, and there is no problem if the IEEE1394 is used in the control system comprising controller and servo drive in which the timer delay error has a serious effect.

In the IEEE1394, using Read packet, the cycle timer value of the cycle timer possessed by the response node can be read. By measuring the timer delay from the difference between the cycle timer value acquired by this reading and the cycle timer value of the cycle timer possessed by the request node, it seems possible to measure the actual timer delay.

However, actually, in the response (ReadResponse) packet to the Read packet, since the upper layers of the response node (transaction layer and higher layer) accumulate the cycle tier value in the ReadResponse packet, the subsequent time until actually transmitted from the link layer of response node is not constant, and accurate timer delay cannot be measured by using Read packet and corresponding ReadResponse packet.

Figure 2:
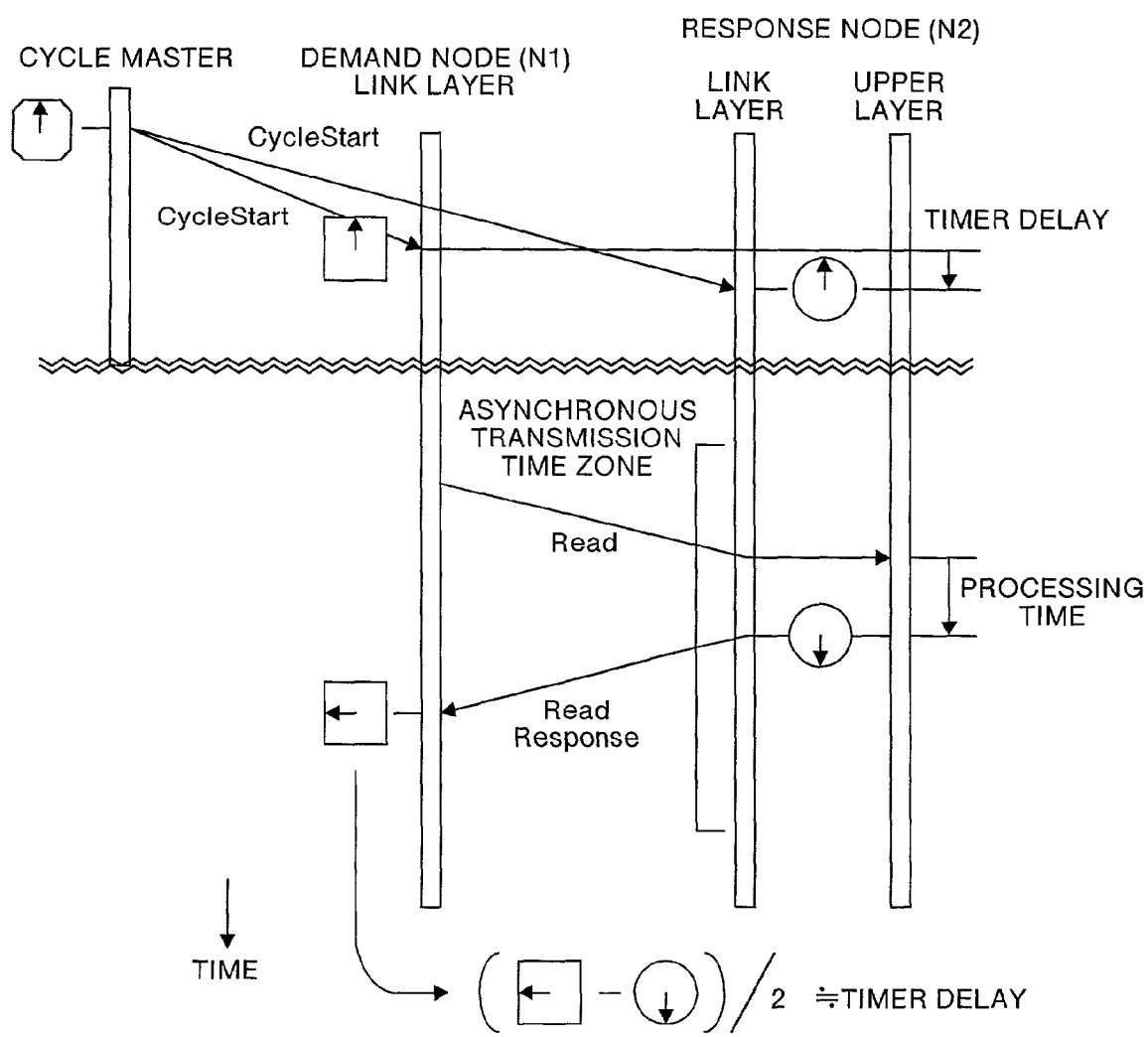
FIG. 2 is a diagram showing an outline of a processing sequence of timer delay compensation in the synchronizing system using IEEE1394.
Figure 3:
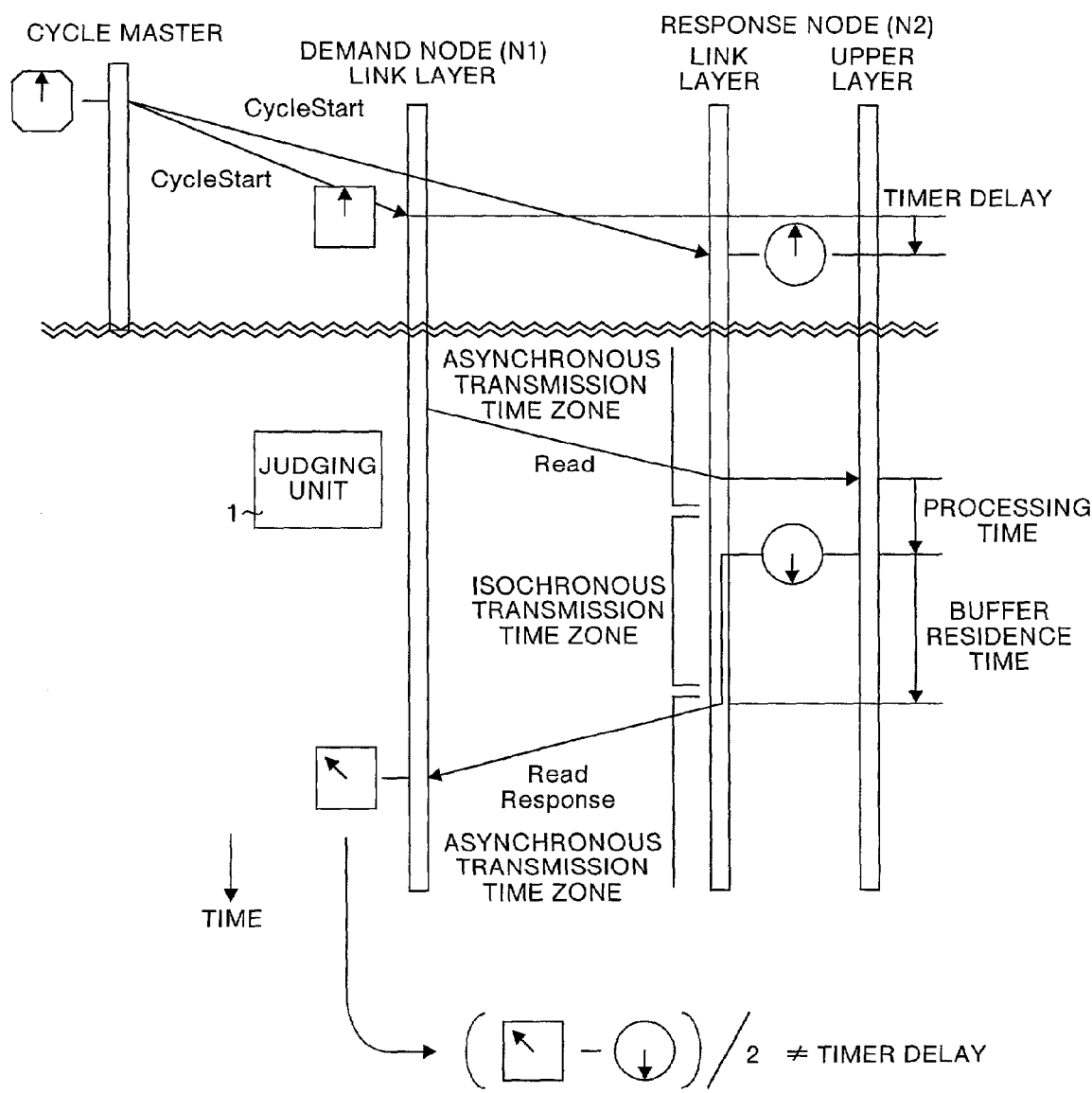
FIG. 3 is a diagram showing an example of a processing sequence of timer delay compensation in a synchronizing system using IEEE1394 in a second embodiment of the invention.

The reason why the time accumulated in the transmission buffer is long is as follows; this read processing is an asynchronous processing, and the Read packet and ReadResponse packet are asynchronous packets, which can be transmitted only in the asynchronous transmission time zone, and therefore if the time of ReadResponse packet accumulated in the transmission buffer is the asynchronous transmission time zone, as shown in FIG. 2, the time staying in the transmission buffer is only a moment so as to be transmitted immediately, but as shown in FIG. 3, when the time of ReadResponse packet being sent to the transmission buffer is an isochronous transmission time zone, the ReadResponse packet stays in the transmission buffer until the isochronous transmission time zone is over and it is ready to transmit in the asynchronous transmission time zone.

To cancel the difference in the time staying in this transmission buffer, several measures are considered. In a first measure, since it is required that a series of operations from receiving of Read packet in the response node N2 until ReadResponse packet is sent out should be always done within the same asynchronous transmission time zone as shown in FIG. 2, the judging unit 1 judges if a series of operation from transmission of Read packet by the request node N1 until ReadResponse packet is returned is done within the same asynchronous transmission time zone or not, and when judged to be done within the same asynchronous transmission time zone, the request node transmits the Read packet to the response node.

Basically, the packet for measuring the timer delay is used in an initial stage after construction of the network, there is no data transfer for control of the control system in the initial stage after construction of the network, and the traffic is light and special application is not working in the upper layer of the response node N2, so that it is quick to respond to request of packet for measurement of timer delay.

Therefore, in the initial stage of construction of the network, the time required to perform the series of operation explained above (i.e. when the packet (Read packet) for timer delay measurement is sent out from the request node N1 to the response node N2, until the request node N1 receives the ReadResponse packet from the response node N2) may be estimated roughly. The delay measurement in the first embodiment may be employed for such rough estimation of time. As a result, the above-mentioned determination can be performed easily, and also the reliability of the determination is high.

According to the first measure, by using the existing protocol directly, only the judging unit 1 is provided in the upper layer of the request node N1 at the transmission side for judging if the series of operation from transmission of Read packet until ReadResponse packet is returned is done within the same asynchronous transmission time zone or not, and this series of operation is done within the same asynchronous transmission time zone, so that accurate timer delay compensation is realized.

Figure 4:
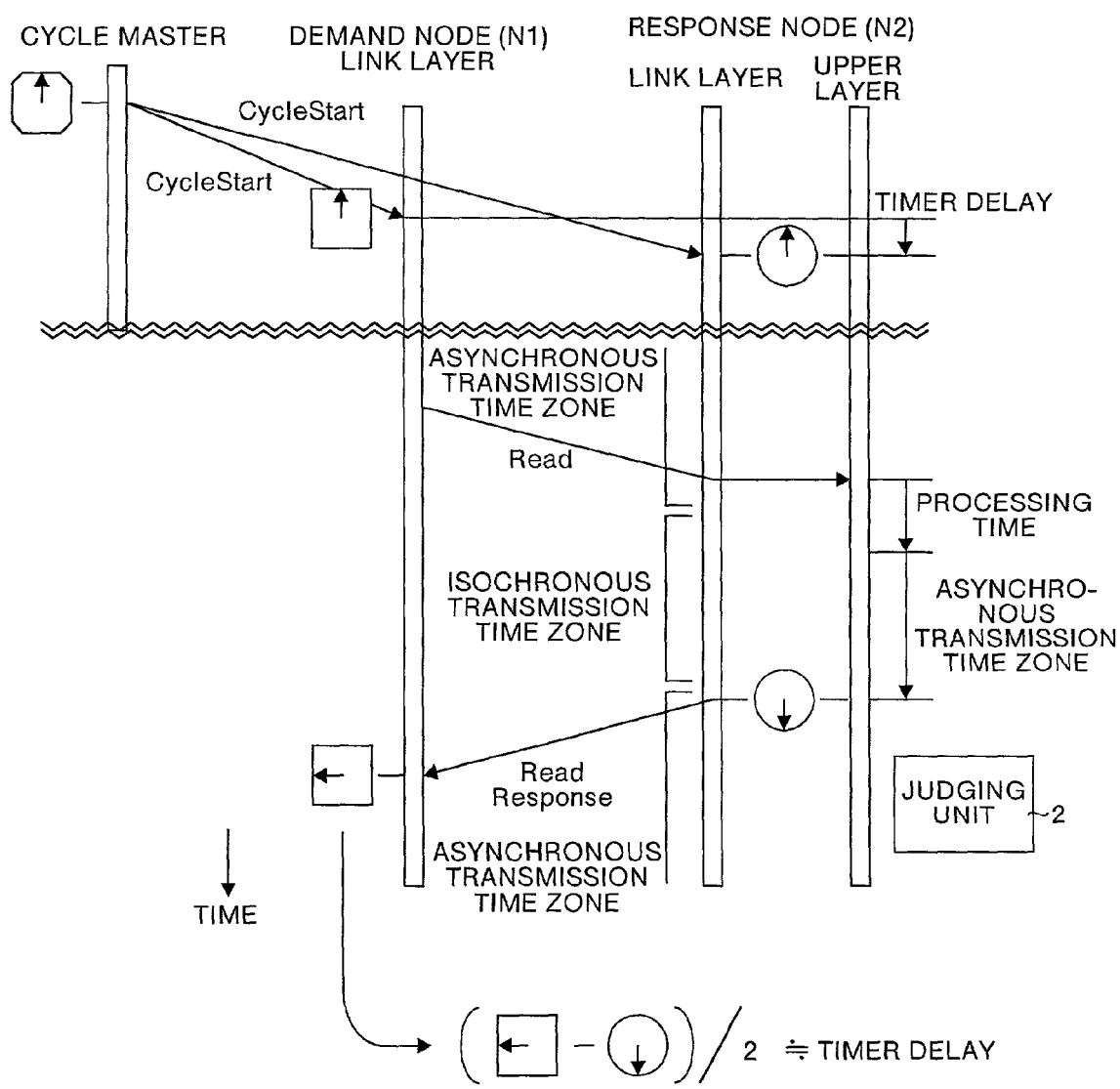
FIG. 4 is a diagram showing an example of a processing sequence of timer delay compensation in the synchronizing system using IEEE1394 in the second embodiment of the invention.

In a second measure, as shown in FIG. 4, the timing of accumulating the ReadResponse packet in the transmission buffer by the upper layer of the response node N1 should be done within the asynchronous transmission time zone. That is, waiting until the upper layer of the response node N2 becomes asynchronous transmission time zone, the ReadResponse packet is sent out to the link layer. The upper layer knows that the present communication transmission path state is in isochronous transmission time zone or asynchronous transmission time zone by the interrupt signal from the lower link layer. Therefore, since the ReadResponse packet can always be transmitted instantly (i.e. without staying in the transmission buffer), the timer delay between the request node N1 and response node N2 can be measured securely.

According to the second measure, using the existing protocol, only by providing the judging unit in the upper layer of the response node N2 at the response side node for judging if the present communication transmission path state is in isochronous transmission time zone or asynchronous transmission time zone, accurate timer delay compensation is possible whether the Read packet and ReadResponse packet are in the same asynchronous transmission time zone or not.

Figure 5:
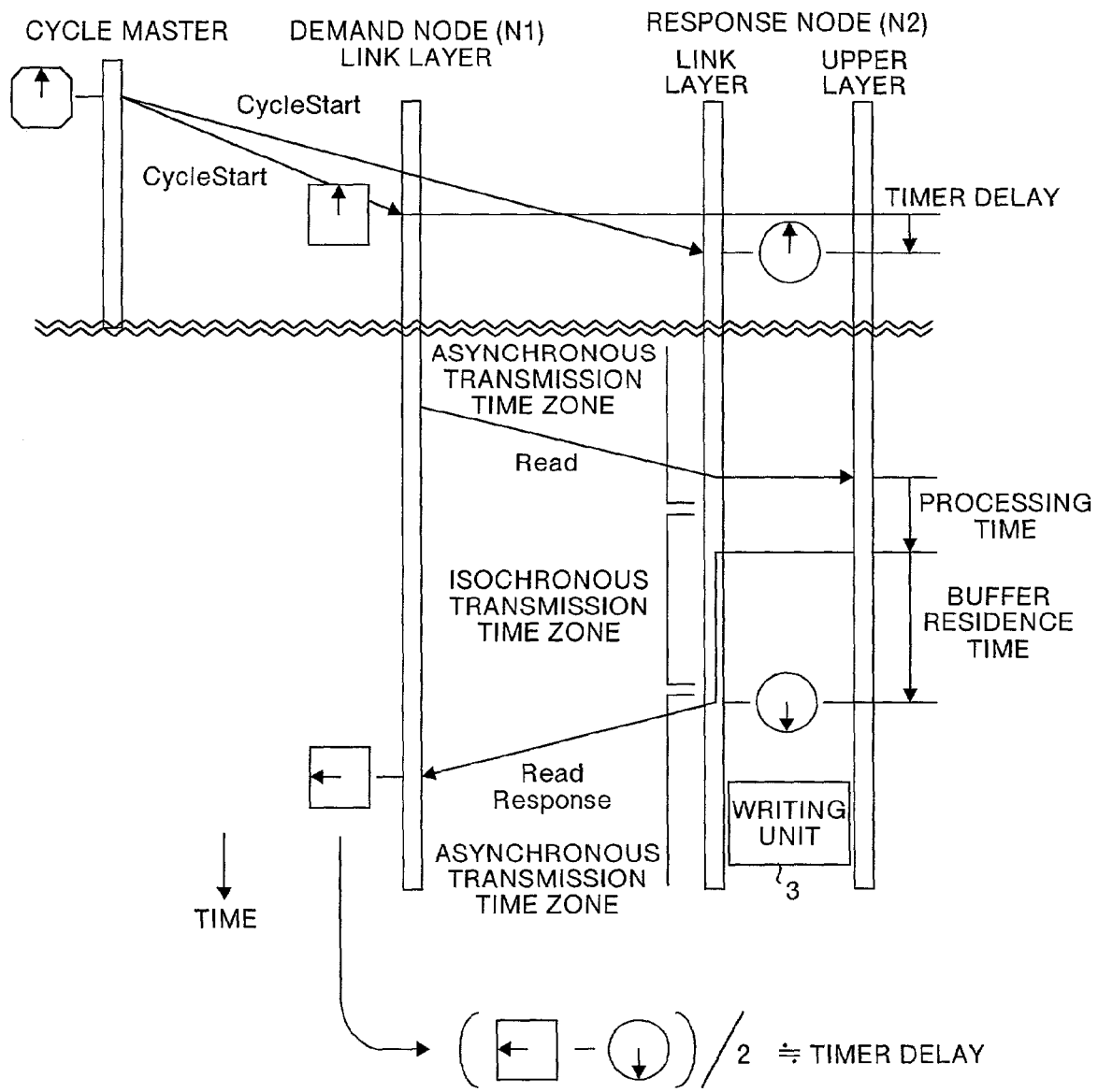
FIG. 5 is a diagram showing an example of a processing sequence of timer delay compensation in the synchronizing system using IEEE1394 in the second embodiment of the invention.

In a third measure, as shown in FIG. 5, when sending out the ReadResponse packet from the link layer, a writing unit 3 writes the cycle timer value in this ReadResponse packet. That is, instead of writing the cycle timer value when the ReadResponse packet is sent to the link layer from the upper layer, the cycle timer value is written into this ReadResponse packet at the moment when the ReadResponse packet is sent out from the link layer.

In the IEEE1394, in the cycle timer setting by CycleStart packet, it already has a mechanism for setting the cycle timer value described in the CycleStart packet as the cycle timer value of the own node at the moment when the CycleStart packet sent from the cycle master is received in the link layer by the response node N2.

However, this mechanism is intrinsic to the CycleStart packet, and the mechanism for realizing the third measure is not defined in the IEEE1394, and this mechanism must be newly added. In the first and second measures, it takes a certain time of transmitted immediately after being accumulated in the transmission buffer, even such slight time error does not occur in the third measure, and more accurate delay measurement is possible.

According to the third measure, using the existing protocol, only by providing the writing unit 3 in the link layer of the response node at the response side node for writing the cycle timer value in the ReadResponse packet at the moment when the ReadResponse packet is sent out from the link layer, accurate timer delay compensation is possible whether the Read packet and ReadResponse packet are in the same asynchronous transmission time zone or not.

According to the second embodiment, by compensating for the timer delay of the cycle timer of each node within the range of the specification of the IEEE1394 (the existing specification of IEEE1394-1995), synchronism of high precision is realized if the IEEE1394 is used in an arbitrary application. Further, if the IEEE1394 is used as an open interface between the controller and servo drive, it is possible to compensate for the timer delay between the controller and servo drive or between servo drives, and control of high speed and high precision is realized. The packet used in the timer delay measurement can be used not by the cycle master only, but by all nodes equally, so that the timer delay between arbitrary nodes can be measured.

Further, a third embodiment of the invention is explained. In the third embodiment, on the basis of the timer delay measured in the first embodiment or the second embodiment, the timer delay is compensated. In the third embodiment, it is explained that the timer delay is compensated when the cycle slave side receives the CycleStart packet.

First, the cycle slave must have the knowledge of the timer value of the cycle slave itself, and the delay deviation to the cycle timer value of the cycle master. To acquire the delay deviation, the following nine modes of delay deviation acquisition may be employed.

Figure 6:
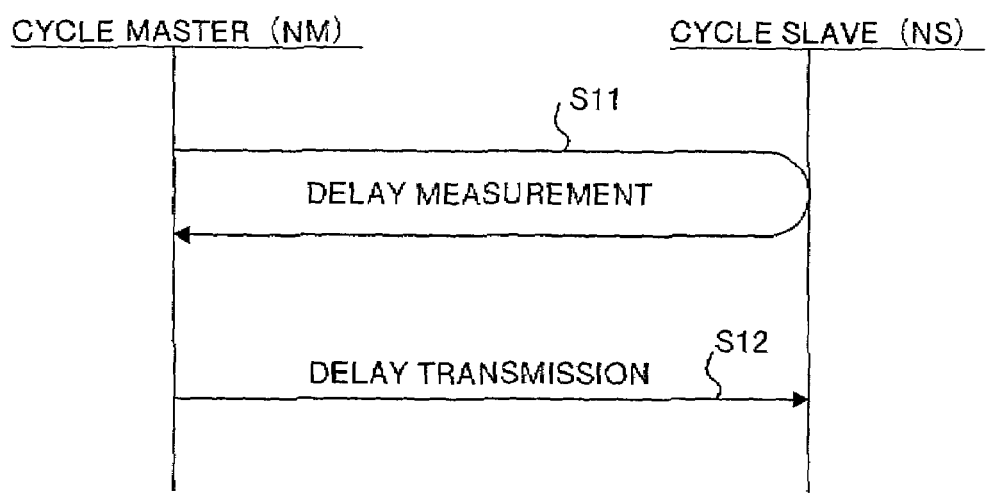
FIG. 6 is a diagram showing an example of an acquisition processing sequence of delay deviation.

In a first delay deviation acquisition mode, as shown in FIG. 6, the cycle master MN measures the delay deviation to an arbitrary cycle slave NS (S11), and transmits this delay deviation to the corresponding cycle slave NS (S12), so that the cycle slave NS acquires the delay deviation.

Figure 7:
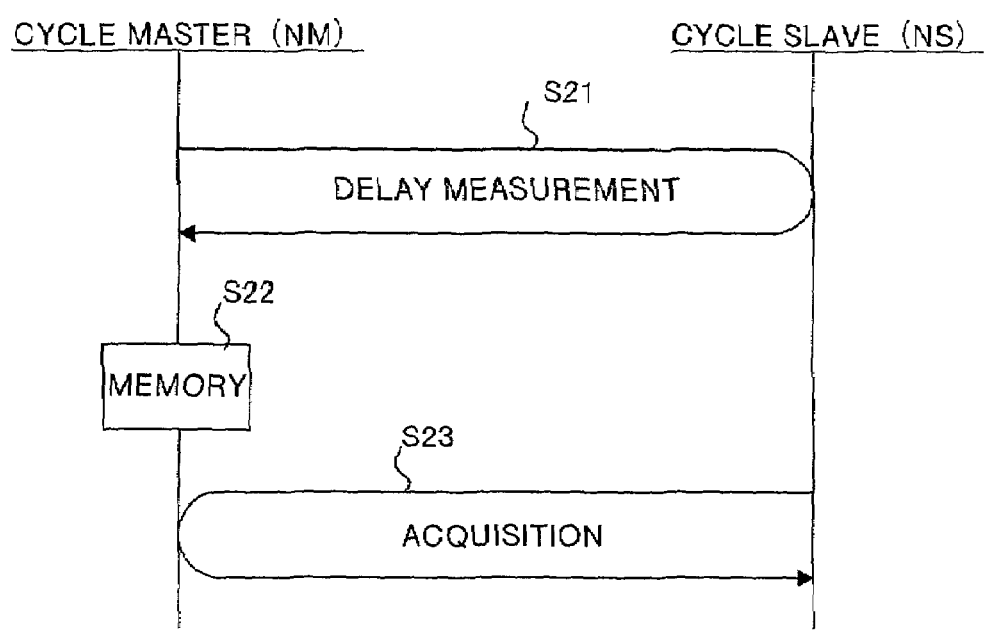
FIG. 7 is a diagram showing an example of an acquisition processing sequence of delay deviation.

In a second delay deviation acquisition mode, as shown in FIG. 7, the cycle master MN measures the delay deviation to an arbitrary cycle slave NS (S21), and stores this delay deviation in delay memory of the cycle master NS (S22), and the arbitrary cycle slave NS accesses the delay memory of the cycle master NM, and reads the delay deviation (S23), so that the cycle slave NS acquires the delay deviation.

Figure 8:
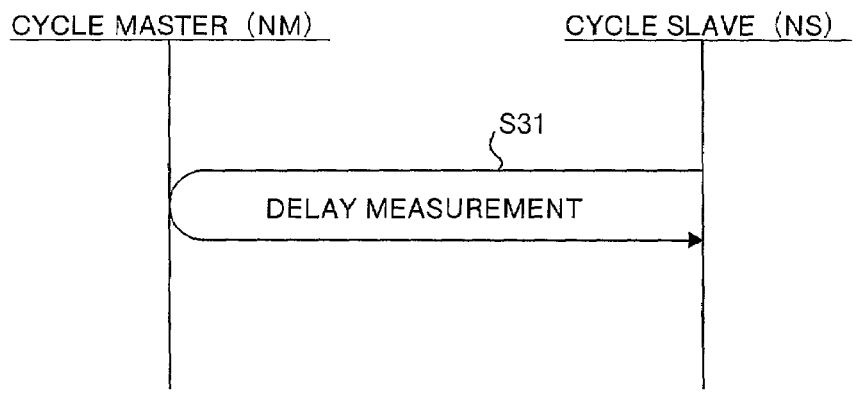
FIG. 8 is a diagram showing an example of an acquisition processing sequence of delay deviation.

In a third delay deviation acquisition mode, as shown in FIG. 8, an arbitrary cycle slave NS measures the delay deviation to the cycle master NM (S31), and hence acquires the delay deviation.

According to the first to third delay deviation acquisition modes, the cycle slave NS can compensate so as to be matched precisely with the timer value of the cycle master NM.

Figure 9:
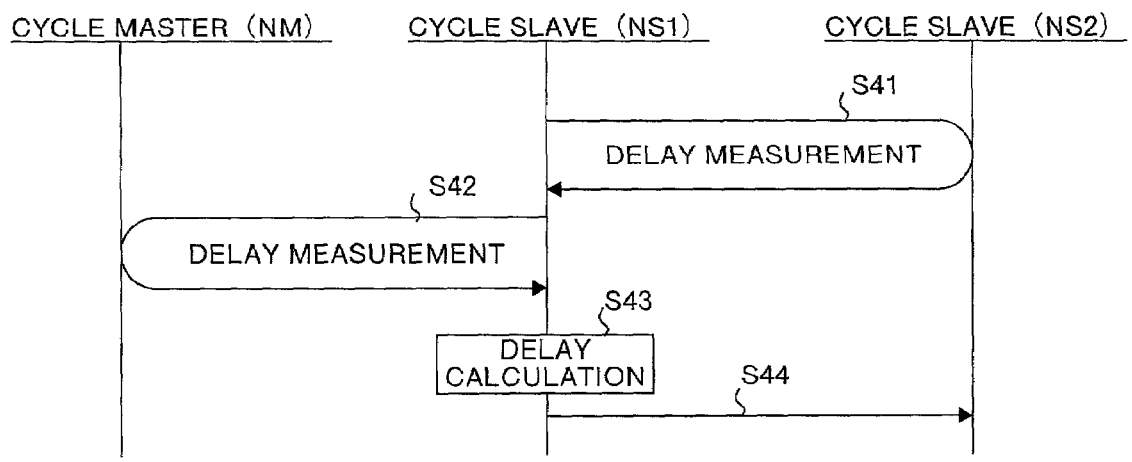
FIG. 9 is a diagram showing an example of an acquisition processing sequence of delay deviation.

In a fourth delay deviation acquisition mode, as shown in FIG. 9, a specific cycle slave NS1 measures the delay deviation to other arbitrary cycle slave NS2 (S41), and also measures the delay deviation to the cycle master NM (S42), calculates the delay between the cycle master NM and the arbitrary cycle slave NS2 (S43), and transmits this delay to the cycle slave NS2 (S44), so that the arbitrary cycle slave NS2 acquires the delay deviation.

Figure 10:
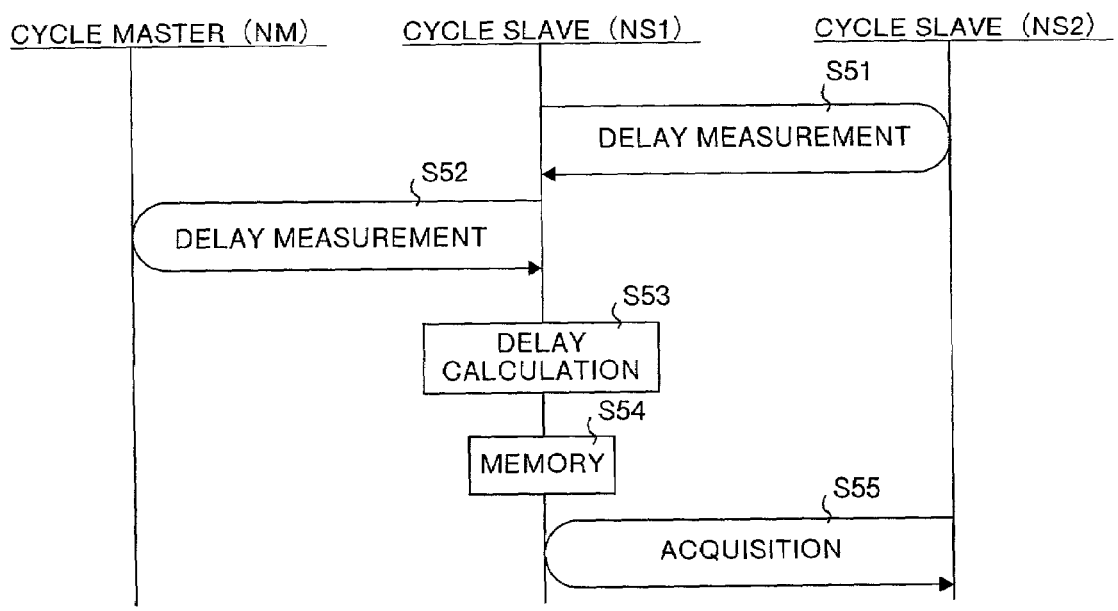
FIG. 10 is a diagram showing an example of an acquisition processing sequence of delay deviation.

In a fifth delay deviation acquisition mode, as shown in FIG. 10, a specific cycle slave NS1 measures the delay deviation to other arbitrary cycle slave NS2 (S51), and also measures the delay deviation to the cycle master NM (S52), calculates the delay between the cycle master NM and the arbitrary cycle slave NS2 (S53), stores the calculated delay deviation in delay memory of the specific cycle slave (S54), and the arbitrary cycle slave NS2 accesses this delay memory and reads this delay (S55), so that the arbitrary cycle slave NS2 acquires the delay deviation.

Figure 11:
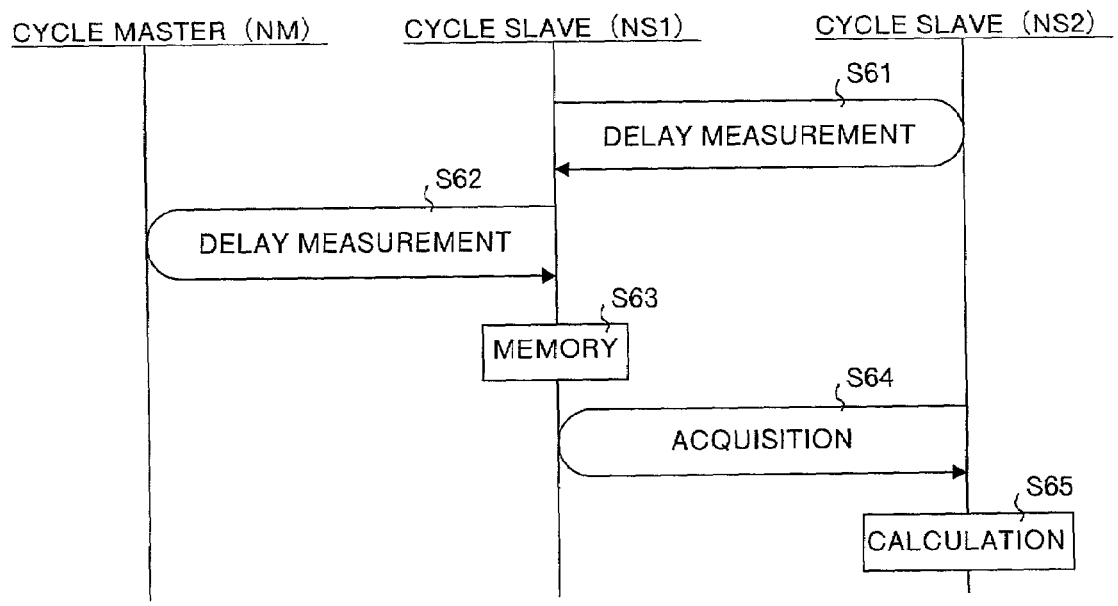
FIG. 11 is a diagram showing an example of an acquisition processing sequence of delay deviation.

In a sixth delay deviation acquisition mode, as shown in FIG. 11, a specific cycle slave NS1 measures the delay deviation to other arbitrary cycle slave NS2 (S61), and also measures the delay deviation to the cycle master NM (S62) and stores these delays in delay memory of the specific cycle slave NS1 (S63), and the arbitrary cycle slave NS2 accesses this specific cycle slave NS1 and reads these delays (S64), and calculates the delay to the cycle master NM (S65).

These fourth to sixth delay deviation acquisition modes have the same actions and effects as the first to third delay deviation acquisition modes, but are slightly complicated in the mechanism.

Figure 12:
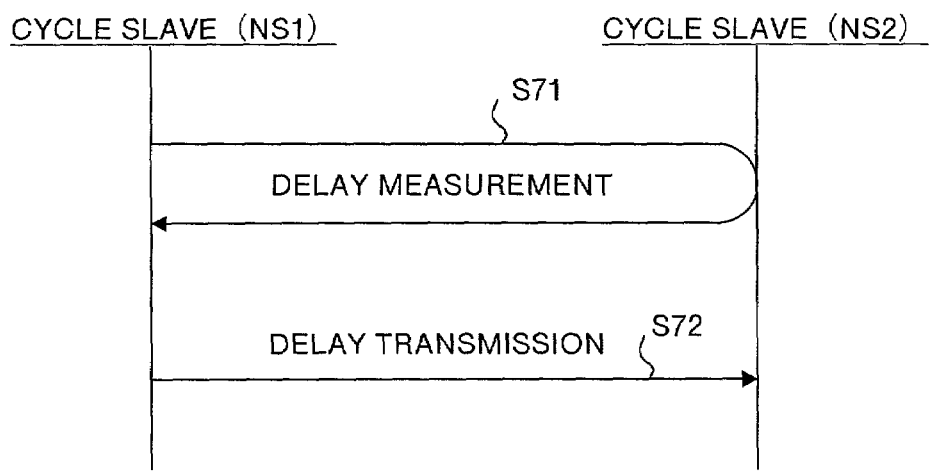
FIG. 12 is a diagram showing an example of an acquisition processing sequence of delay deviation.

In a seventh delay deviation acquisition mode, as shown in FIG. 12, a specific cycle slave NS1 measures the delay deviation to other arbitrary cycle slave NS2 (S71), and transmits this delay deviation to the arbitrary cycle slave NS2 (S72), so that the arbitrary cycle slave NS2 acquires the delay deviation.

Figure 13:
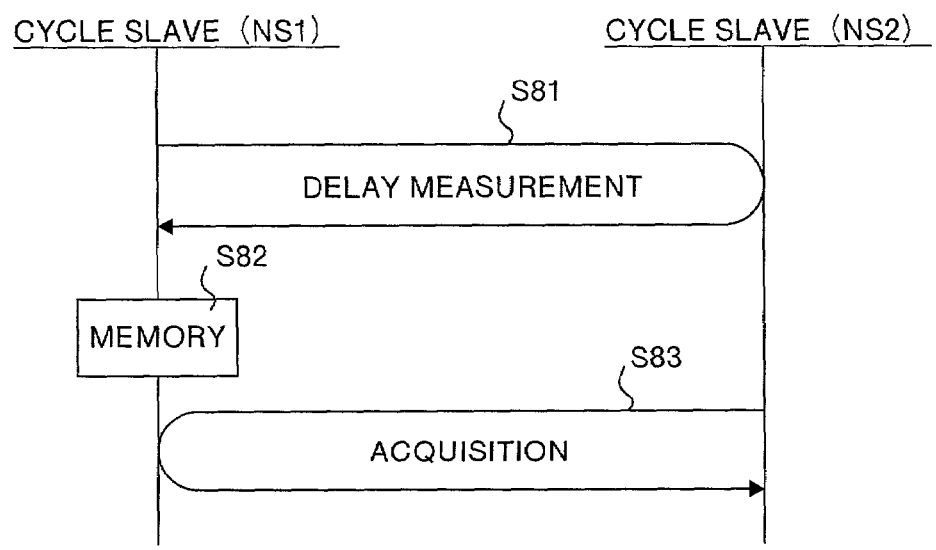
FIG. 13 is a diagram showing an example of an acquisition processing sequence of delay deviation.

In an eighth delay deviation acquisition mode, as shown in FIG. 13, a specific cycle slave NS1 measures the delay deviation to other arbitrary cycle slave NS2 (S81), and stores this delay deviation in delay memory of the own cycle slave NS1 (S82), while the arbitrary cycle slave NS2 accesses this delay memory to read the delay deviation (S83), so that the arbitrary cycle slave acquires the delay deviation.

Figure 14:
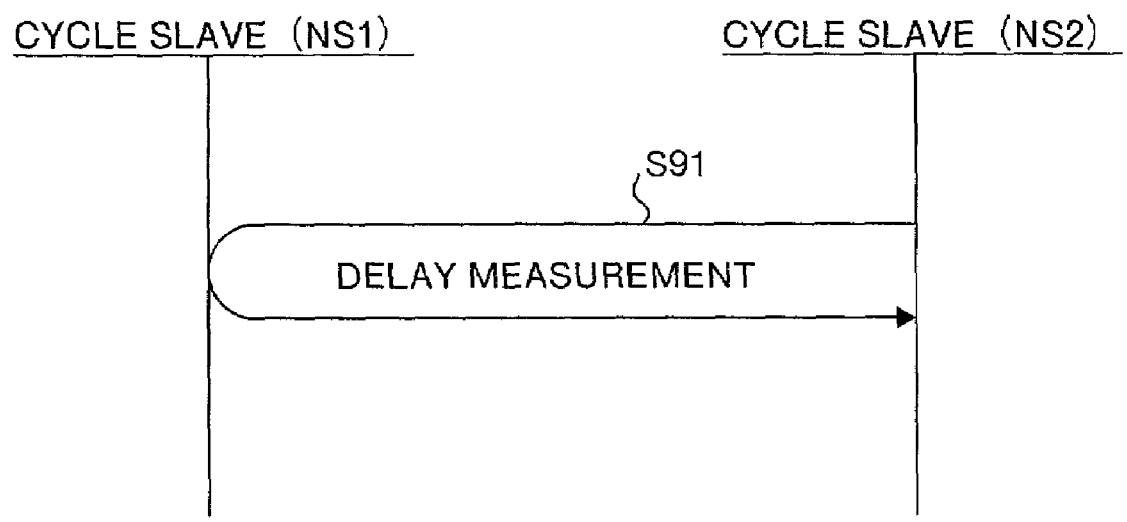
FIG. 14 is a diagram showing an example of an acquisition processing sequence of delay deviation.

In a ninth delay deviation acquisition mode, as shown in FIG. 14, an arbitrary cycle slave NS2 measures the delay deviation to a specific cycle slave NS1 (S91), and hence the arbitrary cycle slave NS2 acquires the delay deviation.

According to the seventh to ninth delay deviation acquisition modes, the timer value of other arbitrary cycle slave can be compensated so as to be matched precisely with the timer value of a specific cycle slave. In this case, only the cycle master does not have the same timer value on the network.

If the cycle slave itself knows the delay deviation between the cycle timer value of the own cycle salve and the cycle timer value of a reference node (either cycle master or cycle slave), the timer delay can be compensated by the cycle slave itself. Three modes may be employed for such timer delay compensation. In the following explanation of three modes, the reference node is the cycle master, but it is the same if the reference node is a cycle slave.

Figure 15:
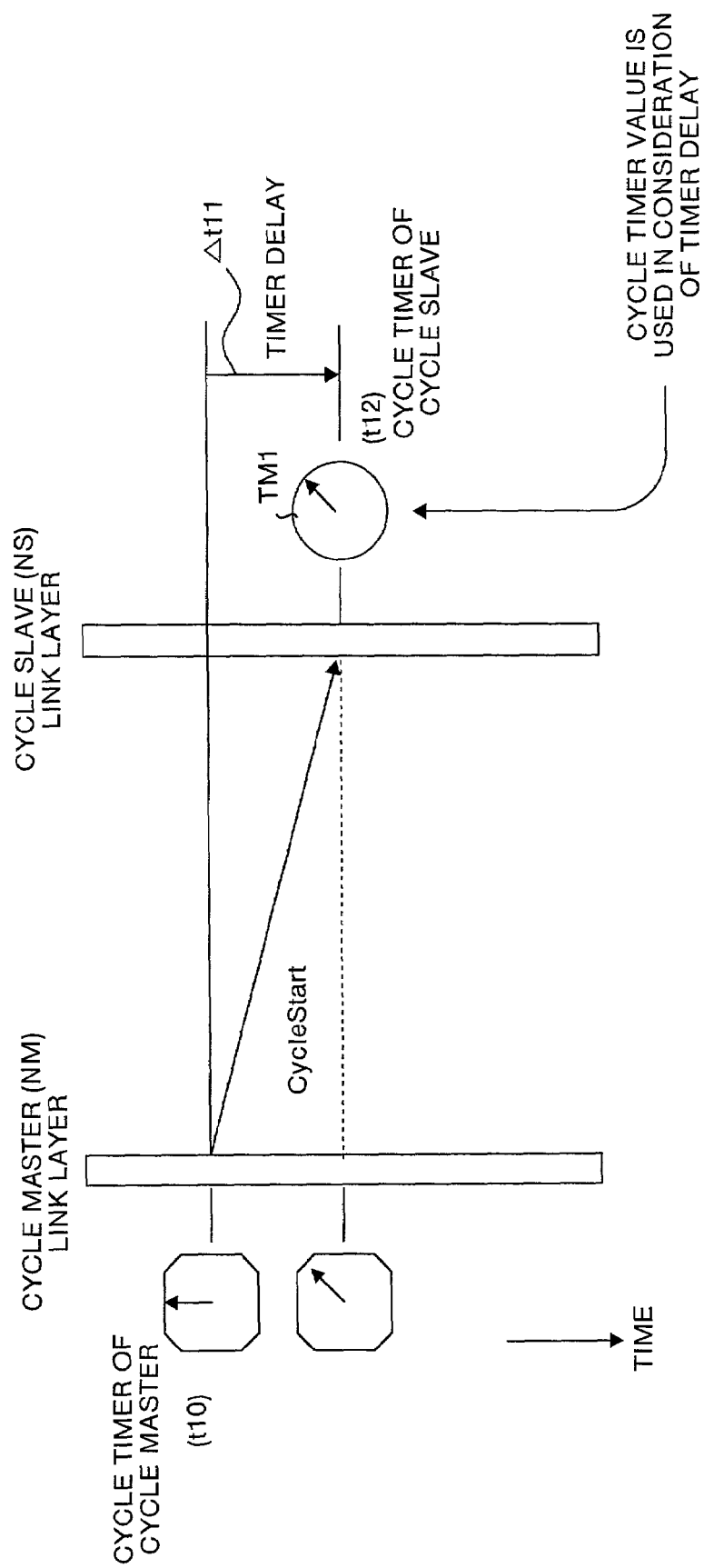
FIG. 15 is a diagram showing an example of a processing sequence of timer delay compensation in a synchronizing system using IEEE1394 in a third embodiment of the invention.

In a first timer delay compensation mode, as shown in FIG. 15, the cycle timer value of cycle timer TM1 is set in consideration of a timer delay amount $\Delta t11$. The cycle master NM transmits the cycle timer value t10 of the cycle master NM to the cycle slave NS by using CycleStart packet, and when the cycle slave NS side receives this CycleStart packet, the cycle timer value t10 is not directly set as the cycle timer value t10 of the cycle timer TM1 of the cycle slave NS, but cycle timer value t12 is set in consideration of the delay deviation amount Δt11. That is, t12 (cycle timer value to be set)= t10 (received cycle timer value)+Δt11 (timer delay amount).

Figure 16:
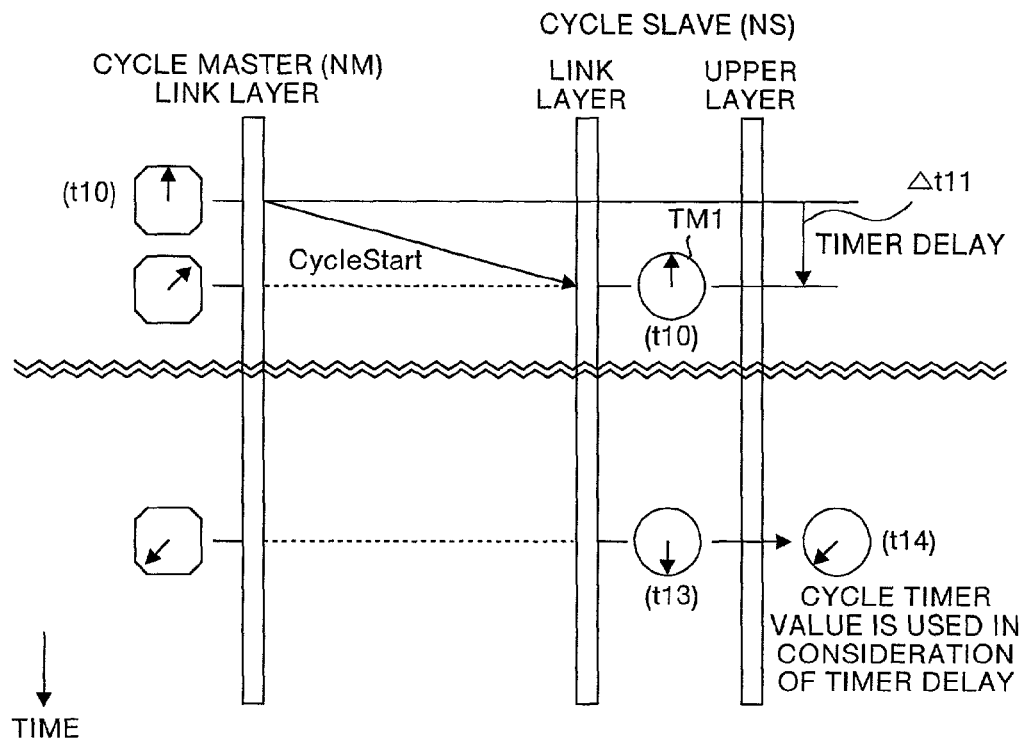
FIG. 16 is a diagram showing an example of a processing sequence of timer delay compensation in the synchronizing system using IEEE1394 in the third embodiment of the invention.

In a second timer delay compensation mode, as shown in FIG. 16, it is same as in the conventional timer setting that the cycle slave NS side sets the cycle timer value t10 when receiving the CycleStart packet directly as the cycle timer value t10 of the own cycle slave NS, but the upper layer of the cycle slave NS (the cycle slave side application) uses the cycle timer value, that is, the delay deviation amount is corrected in the cycle timer value t13 at the time of reading, and the upper layer uses the corrected cycle timer value t14. In this case, if the delay deviation amount is known beforehand, basically, it can be compensated at any time, and the compensated cycle timer value can be used. That is, t14 (cycle timer value to be used)= t13 (cycle timer value of link layer)+Δt11 (timer delay amount).

Figure 17:
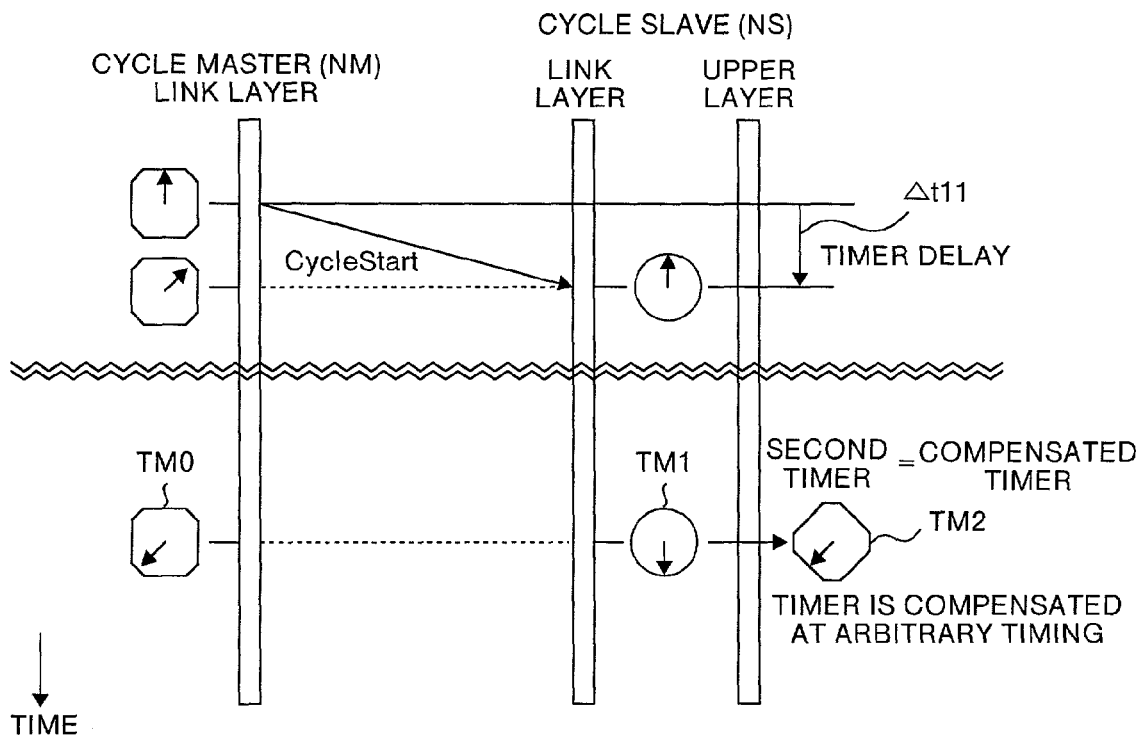
FIG. 17 is a diagram showing an example of a processing sequence of timer delay compensation in the synchronizing system using IEEE1394 in the third embodiment of the invention.

In a third timer delay compensation mode, as shown in FIG. 17, the cycle slave NS has a second cycle timer TM2 aside from the cycle timer TM1. In the cycle timer TM1, the received cycle timer value is set directly, and in the second cycle timer TM2, at an arbitrary timing, for example, when not critical in terms of the time, the cycle timer value compensated for timer delay in consideration of timer delay amount Δt11 is set, and the upper layer uses this cycle timer value.

According to the third embodiment, by compensating for the timer delay of the cycle timer of each node within the range of the specification of the IEEE1394 (the existing specification of IEEE1394-1995), synchronism of high precision is realized if the IEEE1394 is used in an arbitrary application. Further, since all nodes do not require timer compensation, the delay may be measured and compensated only in necessary nodes as required. Moreover, if the IEEE1394 is used as an open interface between the controller and servo drive, it is possible to compensate for the timer delay between the controller and servo drive or between servo drives, and control of high speed and high precision is realized. Since the timer delay is compensated at the servo side, no change is needed at the controller side. Also, all control object devices do not require timer compensation, the delay may be measured and compensated only in necessary servo nodes as required.

The first timer delay compensation mode is simple, and accurate because the interruption by using the timer is the interruption at the time of compensating the delay. However, it requires to change the link layer which is a key part of the IEEE1394. It is also a rule of the IEEE1394 that the timer value must not be set back when updating the timer value by receiving CycleStart packet. In this embodiment, when the cycle timer of the cycle slave is used as the reference, it is possible that the delay deviation may have a negative value and that there is a node for setting back the timer value when compensating the timer delay, and in such a case, the rule of the IEEE1394 must be ignored, or this rule must be observed by setting "cycle timer value of reference cycle slave+certain time" as the reference time on the network so that there may be no node for setting back the timer value when compensating the timer delay. Besides, from the standpoint of the upper layer of the cycle slave for compensating the timer delay, it is not known when the timer is updated, that is, it is not known when the CycleStart packet is sent, and therefore it may be during the time measurement in the upper layer of the cycle slave for compensating the timer delay, and it is possible that the timer may be updated in the midst of a critical time, and an error is caused between when the timer is updated in a critical time and when not.

The cycle timer of the cycle master and the cycle timer of a cycle slave do not always coincide perfectly in characteristics, and there is a difference in precision between both cycle timers, and hence it is the purpose of eliminating the precision difference between cycle timers that the cycle timer of the cycle slave is adjusted by the cycle timer value of the cycle master by the CycleStart packet. However, for example, when the upper layer (its arbitrary application) of the cycle slave for compensating the timer delay measures the time for other different purpose by using the own cycle timer, if the cycle timer is not updated, the precision of this time measurement is guaranteed within the range of the precision of the own cycle timer, but if the cycle timer is updated in the midst of time measurement, the precision of the time measurement is not guaranteed at all. Of course, if the IEEE1394 is used in the system within a range as far as such error does not cause problem, the first timer delay compensation mode is sufficient for this system.

On the other hand, in the second timer delay compensation mode, there is no change at all relating to the IEEE1394, and only the upper layer (application) is changed, and hence it is easy to realize. However, the interruption using this timer is not always the interruption generated by the timer which has compensated the delay. As its substitute means, it is possible to realize interruption at accurate time by polling the timer from the application. It, however, causes a load by polling. Further, same as in the first timer delay compensation mode, there is a problem in the guarantee of timer precision because it is not known when the cycle timer value is updated. As far as applied in a system used in a range having no problem due to polling load or timer updating error, the second timer delay compensation mode can be employed sufficiently.

The third timer delay compensation mode can solve the problems of guarantee due to timer updating error in the first and second timer delay compensation modes. In this third timer delay compensation mode, since the timing is free when setting the cycle timer value in consideration of the timer delay amount as the second cycle timer value in the second cycle timer, it is possible to set the timer value at a desired timing, avoiding a critical time zone such as the time measuring. Moreover, since the interruption by using this timer is the interruption at the time of compensating the delay, it is accurate. Therefore, the timer delay compensation by this third timer delay compensation mode is most preferable.

Next, a fourth embodiment of the invention is explained. In the fourth embodiment, by measuring the timer delay using measurement of timer delay shown in the first and second embodiments, the timer delay is compensated by using this timer delay and time stamp.

Figure 18:
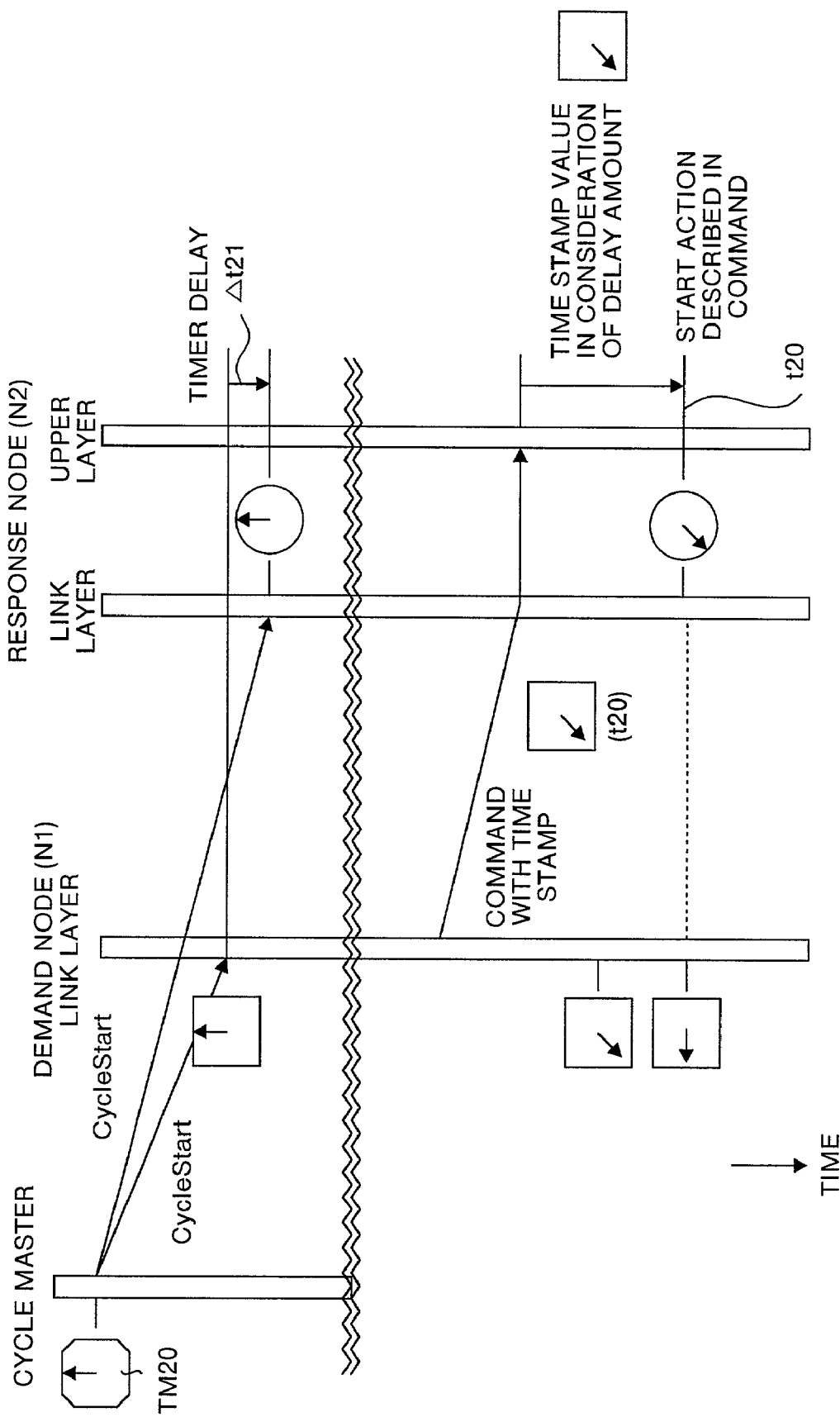
FIG. 18 is a diagram showing an example of a processing sequence of timer delay compensation in a synchronizing system using IEEE1394 in a fourth embodiment of the invention.

FIG. 18 is a diagram showing an outline of a synchronizing system using the time stamp. In FIG. 18, when synchronizing by the request node N1 and response node N2, for example, when controlling synchronously by the controller and each servo driver, it is required to synchronize at a certain time, that is, synchronous control is necessary, but in such a case, together with the command content (control content), the time for executing this command content (control content) is sent as the time stamp from the request node N1 to the response node N2. When the request node N1 is the controller and the response node N2 is the servo driver, the time stamp is sent from the controller to each servo driver. The response node N2 executes the received command content (control content) when reaching the received time, that is, the time of the time stamp (time stamp value) t20.

However, since the time of the response node N2 depends on the cycle timer of the response node N2 itself, and a delay occurs between the response node N2 and request node N1. When the response node N2 accepts the time stamp value from the request node N1, the response node N2 compensates for the delay deviation. In this case each response node N2 must preliminarily know the delay deviation between the cycle timer value of each response node N2 and the cycle timer value of the request node N1. Compensation of the delay deviation by using the time stamp is realized in the following two modes.

In a first timer delay compensation mode by the time stamp, the request node N1 measures the delay deviation to an ordinary response node N2, and transmits this delay to the arbitrary response node N2. The response node N2 can preliminarily acquire the delay deviation amount in the following three modes.

In a first acquiring mode, same as in the first delay deviation acquiring mode shown in FIG. 6, the request node N1 measures the delay deviation to an arbitrary response node N2, and transmits this delay deviation to the arbitrary response node N2.

In a second acquiring mode, same as in the second delay deviation acquiring mode shown in FIG. 7, the request node N1 measures the delay deviation to an arbitrary response node N2, and stores in the delay memory of the request node N1 itself, and the arbitrary response node N2 accesses the delay memory of the request node N1, reads this delay deviation, so that arbitrary response node N2 acquires the delay deviation.

In a third acquiring mode, same as in the third delay deviation acquiring mode shown in FIG. 8, an arbitrary request node N2 measures the delay deviation to the response node N1, and hence acquires the delay deviation.

Figure 19:
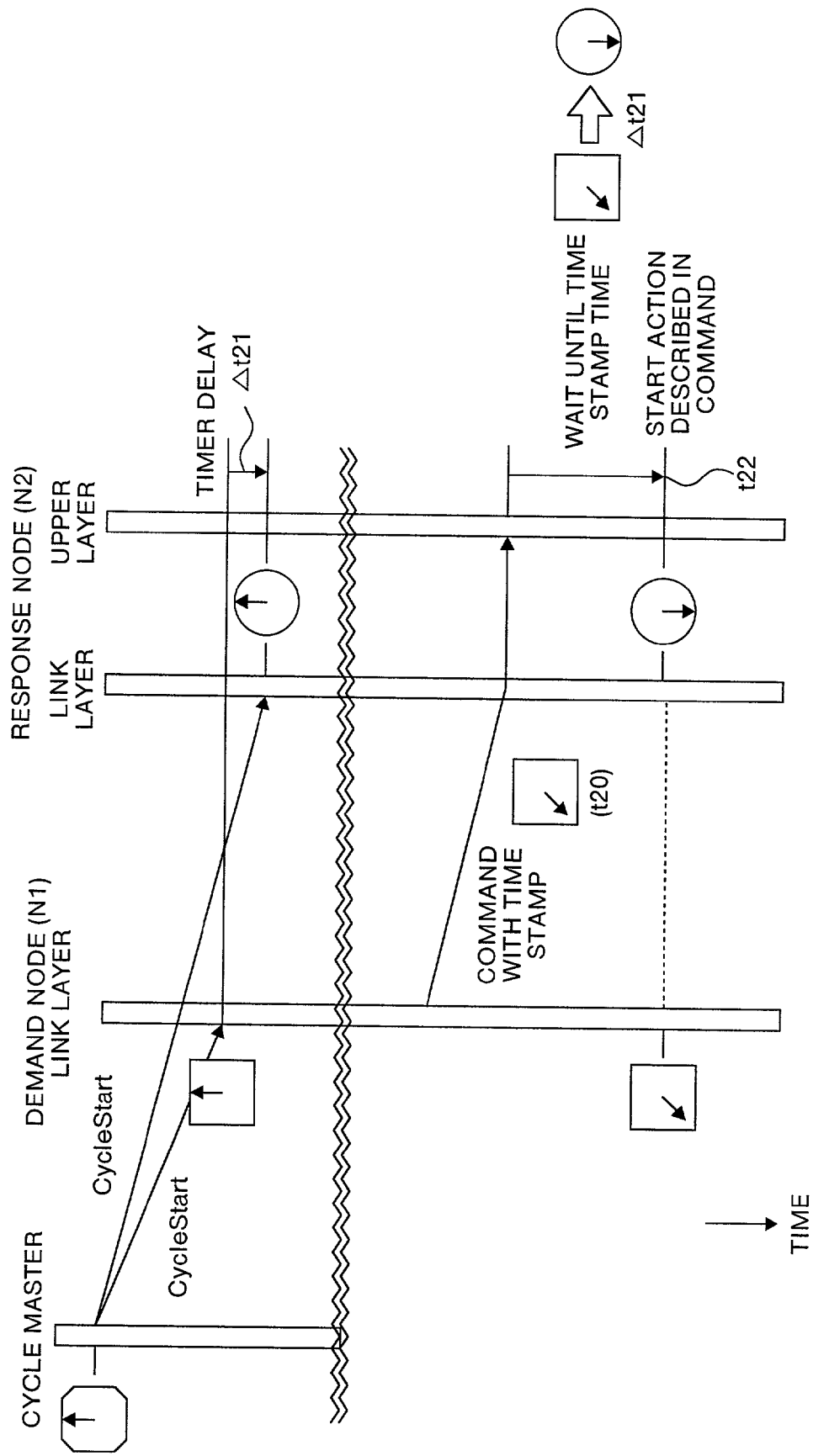
FIG. 19 is a diagram showing an example of a processing sequence of timer delay compensation in the synchronizing system using IEEE1394 in the fourth embodiment of the invention.

Afterwards, as shown in FIG. 19, from the request node N1 to the response node N2, when the time stamp value t20 showing the time for executing the command content (control content) is sent to the response node together with the command content (control content), the response node N2 compensates the received time, that is, the time stamp value t20 by the delay deviation amount $\Delta t21$, and executes the received command content (control content) when reaching the time indicated by the compensated time stamp value t22.

On the other hand, in a second timer delay compensation mode by the time stamp, the request node N1 issues a time stamp in consideration of the delay deviation amount $\Delta t21$ of each response node N2. In this case, the request node N1 must preliminarily know the delay deviation amount $\Delta t21$ between the cycle timer value of the own request node N1 and the cycle timer value of each response node. The delay deviation amount can be acquired in the following three modes.

In a first acquiring mode, the request node N1 measures the delay to each response node N2, and stores in the delay amount memory of the data table format of the own request node N1.

In a second acquiring mode, each response node N2 measures the delay deviation amount $\Delta t21$ to the request node N1, and stores this delay deviation amount $\Delta t21$ in the delay memory of the response node N2 itself, and the request node N1 reads the delay deviation stored in the delay amount memory of the response node N2.

In a third acquiring mode, each response node N2 measures the delay deviation amount to the request node N1, and transmits this delay deviation amount to the request node N1.

Figure 20:
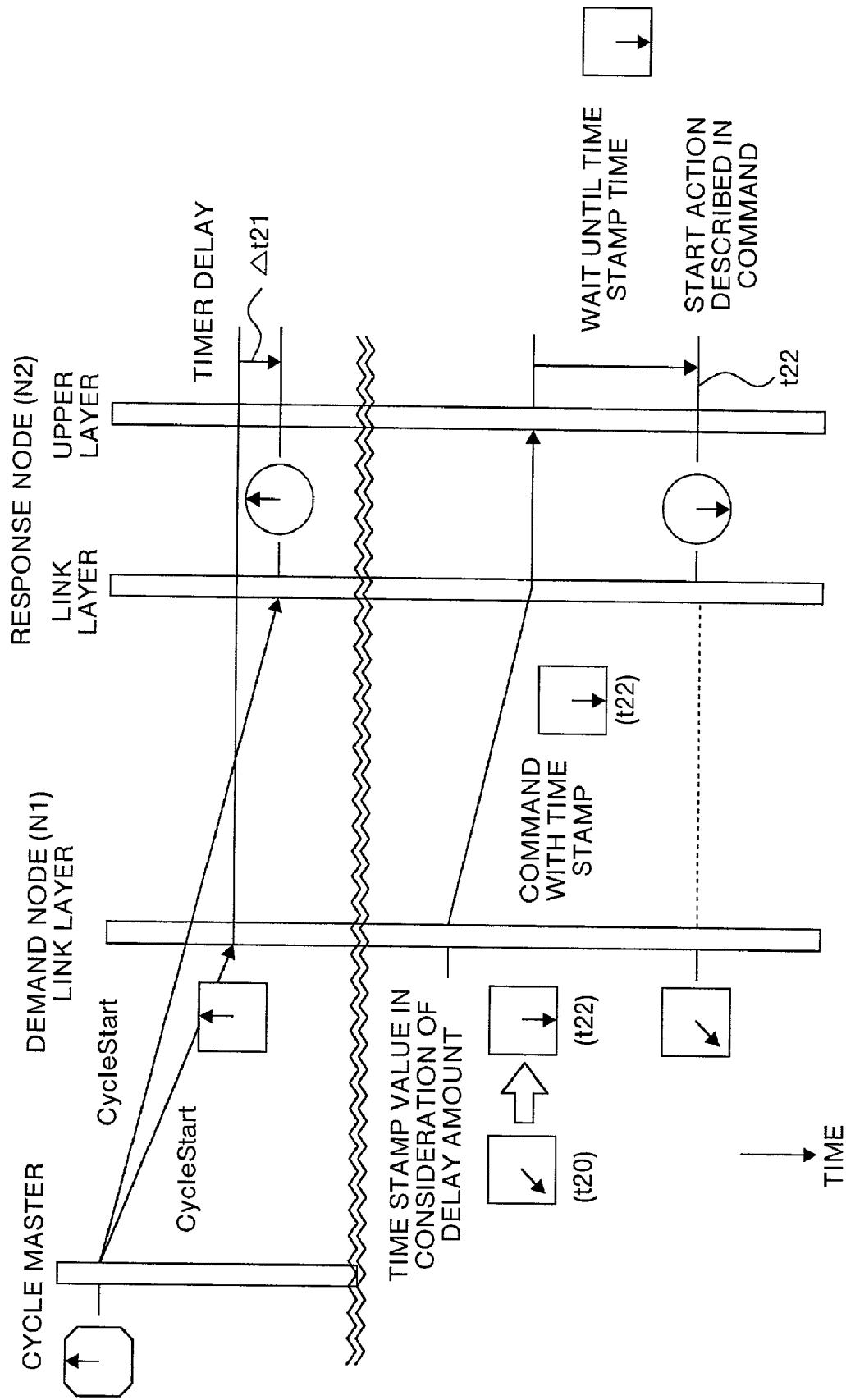
FIG. 20 is a diagram showing an example of a processing sequence of timer delay compensation in the synchronizing system using IEEE1394 in the fourth embodiment of the invention.

Afterwards, as shown in FIG. 20, the request node N1 sets, together with the control content, the time stamp value t20 which is the time for executing this control content, by setting back the time by the portion of the delay deviation amount $\Delta t21$ in consideration of delay deviation amount of each response node N2, and sends from the request node N1 to each response node N2. By contrast, at the response node N2 side, when reaching the time indicated by the received time stamp value t22, the received control content is executed. In this case, since the received time stamp value t22 already includes the consideration of the delay deviation amount, the control content is directly executed.

According to the fourth embodiment, by compensating for the timer delay of the cycle timer of each node within the range of the specification of the IEEE1394 (the existing specification of IEEE1394-1995), synchronism of high precision is realized if the IEEE1394 is used in an arbitrary application. Further, since all nodes do not require timer compensation, the delay may be measured and compensated only in necessary nodes as required. Moreover, if the IEEE1394 is used as an open interface between the controller and servo drive, it is possible to compensate for the timer delay between the controller and servo drive or between servo drives, and control of high speed and high precision is realized. Since the timer delay is compensated at the servo side, no change is needed at the controller side. Also, all control object devices do not require timer compensation, the delay may be measured and compensated only in necessary servo nodes as required.

Finally, a fifth embodiment of the invention is explained. In the fifth embodiment, the IEEE1394 shown in the first to fourth embodiments is used as an open interface between a controller and a servo driver.

Herein, although the controller may be a cycle slave, the servo driver as control object device may be other cycle slave, and one of the servo drivers of the control object devices may be the cycle master, it is preferred to use the controller as the cycle master and all servo drivers of control object devices as cycle slaves.

The controller sends out data such as servo data by isochronous packet to the servo driver, and the servo driver returns the feedback data by isochronous packet and others to the controller. In this case, when the controller is the cycle master, in the isochronous transmission time zone, the control packet of the controller can be sent out by priority, that is, at the beginning of the isochronous packet.

By properly combining the first to fourth embodiments, the timer delay measurement and compensation of the controller and servo driver may be executed, but, in the timer delay compensation processing sequence explained herein, a series of operation about measurement of timer delay is managed by the controller, and the timer delay compensation is executed at the servo driver side.

Figure 21:
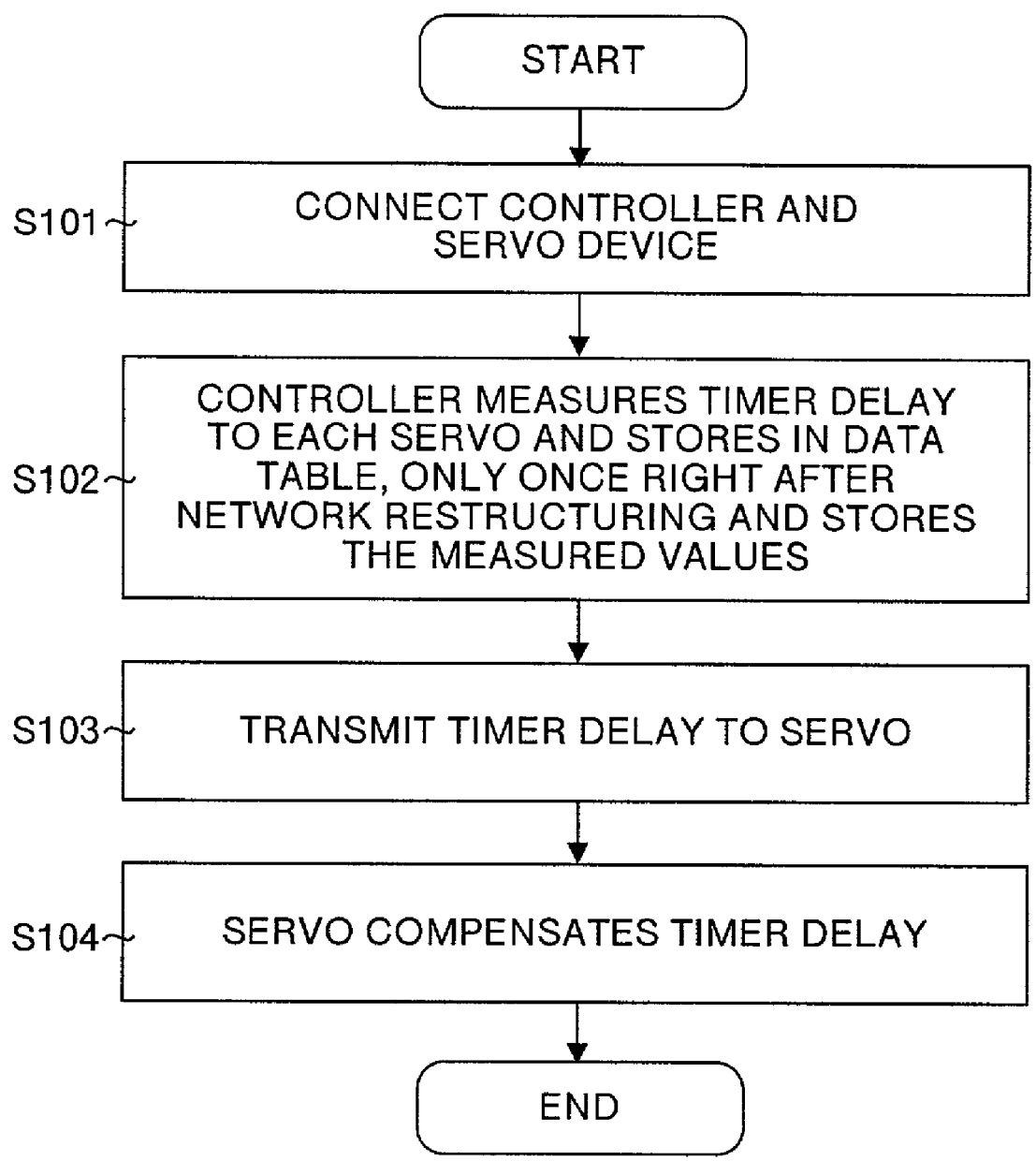
FIG. 21 is a flowchart showing an example of a delay deviation correcting process when a synchronizing system using IEEE1394 in a fifth embodiment of the invention is applied in a control system composed of a controller and one or more servo drives.

FIG. 21 is a flowchart showing the timer delay compensation processing procedure in the case of the timer delay compensation executed at the servo driver side. In FIG. 21, first, the servo driver is connected to the controller (step S101). Then the network structure change judging unit of the controller detects change in the network structure, and only once after restructuring the network, the controller measures the timer delay between the servo drivers, and this timer delay amount is stored in the data table of the controller itself (step S102).

Afterwards, the controller transmits the timer delay amount to each servo driver (step S103), and receiving this timer delay amount, the servo driver compensates the timer delay on the basis of this timer delay amount (step S104), thereby finishing this process.

Figure 22:
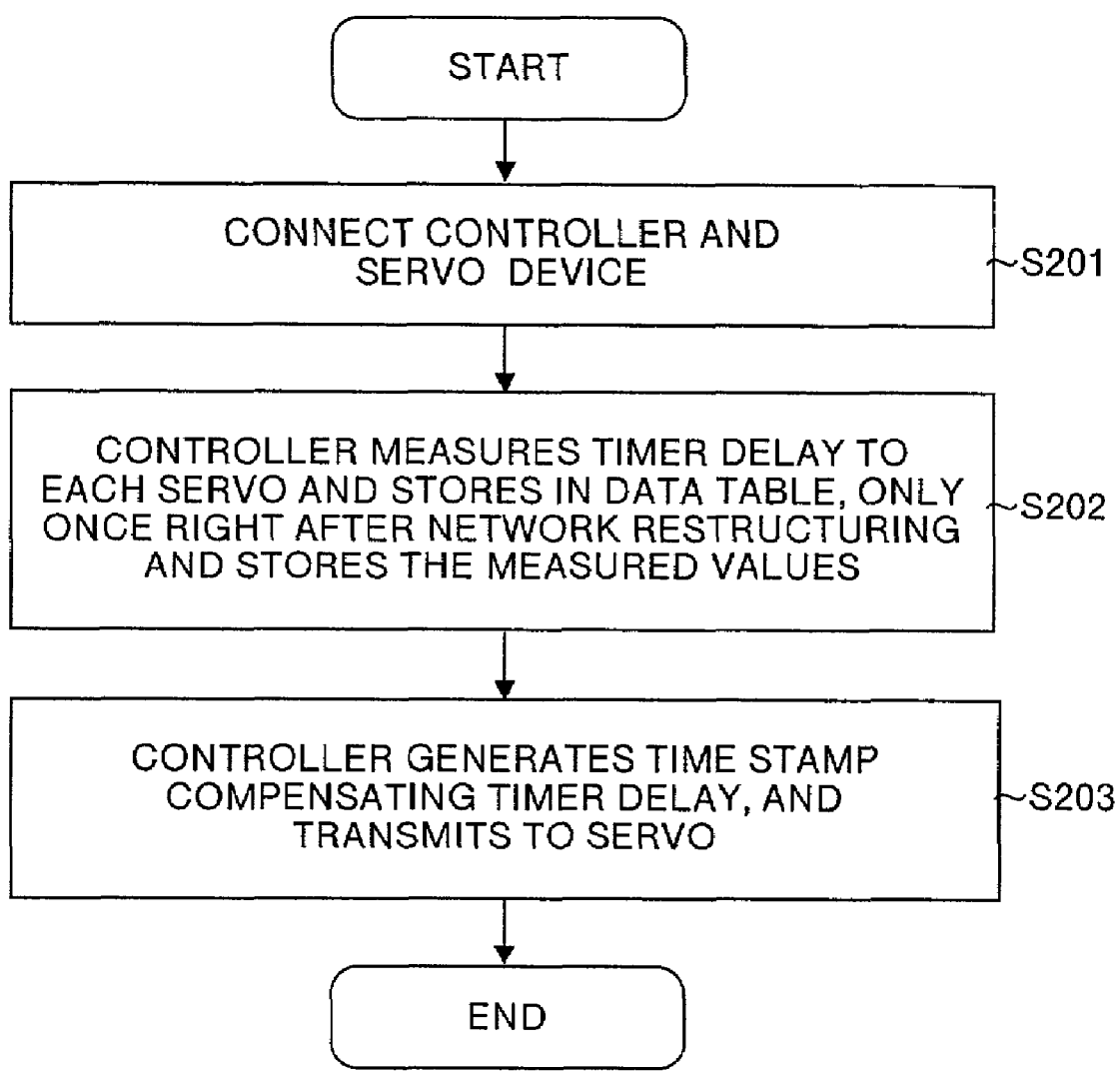
FIG. 22 is a flowchart showing an example of a delay deviation correcting process procedure when the synchronizing system using IEEE1394 in the fifth embodiment of the invention is applied in a control system composed of a controller and one or more servo drives.
Figure 23:
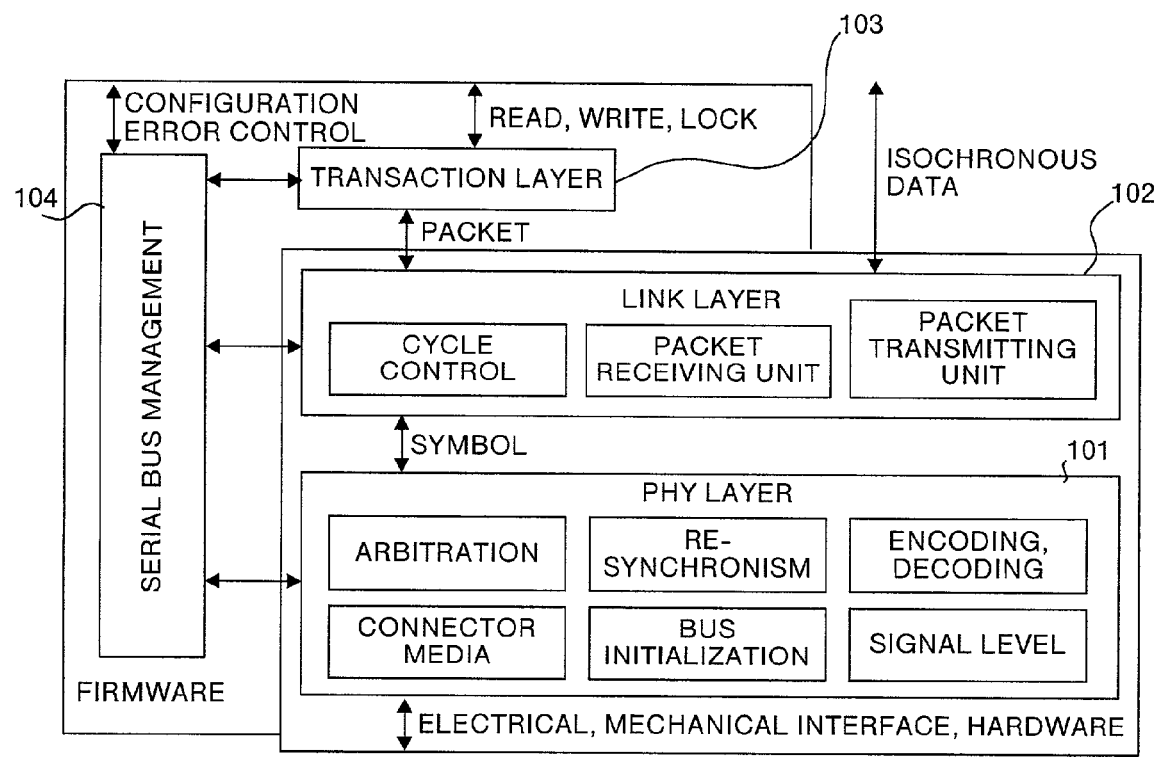
FIG. 23 is a diagram showing a communication layer structure of IEEE1394.

Next, in the case of generation of time stamp compensated for the delay by the controller, the timer delay compensation processing sequence is explained. FIG. 22 is a flowchart showing the delay compensation processing procedure when the generating the time stamp compensated for the delay by the controller. In FIG. 22, same as in the case of step S101, the servo driver is connected to the controller (step S201). Then the network structure change judging unit of the controller detects change in the network structure, and only once after restructuring the network, the controller measures the timer delay between the servo drivers, and this timer delay amount is stored in the data table of the controller itself (step S202). Afterwards, the controller generates the time stamp compensated for the timer delay amount, and transmits to the servo drive side (step S203), thereby finishing this process.

In the fifth embodiment, even in the case of the system requiring synchronism of high speed and high precision, as in the case of the control system composed of controller and servo drive, the timer delay compensation between the controller and servo drive can be executed securely and precisely by using an open interface of the IEEE1394 between the controller and the servo drive.

As described herein, according to the present invention, when synchronizing the nodes in the network connected by using the IEEE1394, the cycle timer delay measuring unit measures the delay deviation amount between the cycle timers of each node, and the cycle timer delay correcting unit corrects the deviation delay between the timers on the basis of the delay deviation amount measured by the cycle timer delay measuring unit, and therefore the timer delay between cycle timers of each node can be compensated within the specification range of the IEEE1394, and the system capable of executing synchronous control of high speed and high precision is realized.

Furthermore, the cycle timer delay measuring unit, when measuring the delay deviation amount between a request node and a response node, transmits a packet that can be responded by the response node in a physical layer from the request node to the response node, measures the required time from transmission of the packet by the request node until the packet returned by the physical layer of the response node corresponding to the packet is returned to the request node, and calculates the delay deviation amount by using the maximum value, minimum value, average or weighted average of the response time of the physical layer itself of the response node, and therefore the delay deviation amount between cycle timers can be estimated easily.

Furthermore, the packet sent out from the request node to the response node is a Ping packet, and the packet returned from the response node to the request node is a Self_ID packet, so that the packet response is realized in the physical layer of the response node, and therefore the delay deviation amount between cycle timers can be estimated easily.

Furthermore, the packet sent out from the request node to the response node is a RemoteAccess packet, and the packet returned from the response node to the request node is a RemoteReply packet, so that the packet response is realized in the physical layer of the response node, and therefore the delay deviation amount between cycle timers can be estimated easily.

Furthermore, the packet sent out from the request node to the response node is a RemoteCommand packet, and the packet returned from the response node to the request node is a RemoteConfirm packet, so that the packet response is realized in the physical layer of the response node, and therefore the delay deviation amount between cycle timers can be estimated easily.

Furthermore, the cycle timer delay measuring unit transmits a Read packet from a request node to a response node, reads the cycle timer value of the response node, and when the request node receives a ReadResponse packet including this cycle timer value being read, calculates the delay deviation amount on the basis of the difference between the received cycle timer value and the cycle timer value of the request node, and therefore by reading the cycle timer values, the delay deviation amount between cycle timers can be easily obtained.

Furthermore, the judging unit of the request node judges if a series of sequence from transmission of the Read packet till return of the ReadResponse packet is completed or not within a same asynchronous transmission time zone which is the time zone of same asynchronous transmission, and when the judging unit judges to be completed within the same asynchronous transmission time zone, a Read packet is sent out to the response node, so that the ReadResponse packet may be returned within the same asynchronous transmission time zone, and therefore the delay deviation amount can be measured at high reliability.

Furthermore, the judging unit of the upper layer of the response node judges whether or not an asynchronous transmission time zone which is a time zone of asynchronous transmission, and when the judging unit judges to be an asynchronous transmission time zone, the upper layer accumulates the ReadResponse packet in a transmission buffer (TX_FIFO), so that the ReadResponse buffer may be immediately returned to the request node without staying long in the transmission buffer, and therefore the delay deviation amount can be measured at high reliability.

Furthermore, the writing unit of the link layer of the response node writes the cycle time value of the corresponding response node into the ReadResponse packet just before the ReadResponse packet is sent out from the link layer buffer, and therefore the delay deviation amount can be measured at high reliability.

Furthermore, the cycle timer delay memory of each node stores the delay deviation amount, and acquires the delay deviation amount at least by access from other node, and therefore the delay deviation amount can be acquired efficiently.

Furthermore, the cycle timer delay memory stores the delay deviation amount among all nodes in a data table format, and therefore the delay deviation amount can be acquired efficiently.

Furthermore, the cycle timer delay memory is provided in the node as a cycle master, and therefore the delay deviation amount can be managed efficiently.

Furthermore, if the network structure change judging unit judges change in the network structure, after restructuring the network, the cycle timer delay measuring unit measures the mutual delay deviation amount of cycle timers, and the cycle timer delay correcting unit corrects only once the mutual delay deviation of cycle timers on the basis of this delay deviation amount, and therefore the delay deviation amount can be measured and corrected accurately and securely without causing any effect on the traffic of the network.

Furthermore, the network structure change judging unit is provided in the node as a cycle master, and therefore the delay deviation can be measured and correctly promptly and efficiently.

Furthermore, the cycle timer delay measuring unit and cycle timer delay correcting unit are provided in the specified node using the synchronism of nodes, and therefore the node requiring synchronism between nodes can securely measure and correct the delay deviation amount.

Furthermore, the node of the cycle master having the cycle timer as the reference for synchronism transmits the delay deviation amount measured by the node to the specified node by the cycle timer delay transmission unit, or stores the delay deviation amount measured by the node in the data table, the specified node acquires the delay deviation amount from the node of the cycle master, and the delay deviation of the cycle timer of the node is corrected on the basis of the delay deviation amount later transmitted to the specified node or the acquired delay deviation amount, and therefore the delay deviation amount can be measured and corrected securely.

Furthermore, the cycle timer delay correcting unit sets the cycle timer value on the basis of the delay deviation amount when receiving the CycleStart packet, and therefore the synchronized control process can be executed securely.

Furthermore, the cycle timer delay correcting unit corrects the delay deviation by using the delay deviation amount when the upper layer uses the cycle timer value, and therefore the control processing can be executed by using the time corrected of the delay deviation amount at appropriate time, and inconvenience due to miss-matching of the correction timing of the delay deviation amount can be eliminated.

Furthermore, the cycle timer delay correcting unit of the specified node sets the cycle timer value having corrected the delay deviation by using the delay deviation amount at an arbitrary timing, in the second cycle timer, and therefore the control processing can be executed by using the time corrected of the delay deviation amount at appropriate time, and inconvenience due to matching-matching of the correction timing of the delay deviation amount can be eliminated.

Furthermore, the cycle timer delay correcting unit updates the time stamp value of the time stamp sent from the node of the cycle master on the basis of the delay deviation amount, and the time stamp time monitoring unit monitors the time indicated by the updated time stamp value, and therefore the delay deviation amount can be corrected securely by using the time stamp.

Furthermore, the cycle timer delay measuring unit and cycle timer delay correcting unit are provided in the node as a cycle master, and therefore the delay deviation amount between cycle timers can be measured and corrected efficiently.

Furthermore, the specified node transmissions the delay deviation amount measured by the specified node to the node of cycle master, or acquires the delay deviation amount from the specified node, and the delay deviation of the cycle master of the node of the cycle master is corrected on the basis of the delay deviation amount later transmitted to the specified node or the acquired delay deviation amount, and therefore the delay deviation amount can be measured and corrected securely.

Furthermore, the cycle timer delay correcting unit updates the time stamp value of the time stamp generated by the time stamp generating unit of the node of the own cycle master on the basis of the delay deviation amount, and transmissions the data including this updated time stamp value to the specified node, and therefore the delay deviation amount can be corrected securely by using the time stamp.

Furthermore, the synchronizing system using IEEE1394 may be applied to a control system composed of a servo drive device and a controller for controlling it, and therefore synchronous control of high speed and high precision is securely executed.

Furthermore, the controller is used as the cycle master, so that the delay deviation amount can be measured and corrected efficiently, and therefore a control system capable of executing synchronous control of high speed and high precision can be realized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A synchronizing system using an IEEE1394 serial bus for synchronizing among nodes in a network connected by the IEEE1394 serial bus, said synchronizing system comprising:
a cycle timer delay measuring unit which measures mutual delay deviation amount of each cycle timer of each node, wherein said cycle timer delay measuring unit
transmits a Read packet from a request node to a response node,
reads a cycle timer value of the response node, and, when the request node receives a ReadResponse packet including the cycle timer value being read, calculates the delay deviation amount based on the difference between the received cycle timer value and the cycle timer value of the request node; and
a cycle timer delay correcting unit which corrects mutual delay deviation of each cycle timer based on the delay deviation amount measured by said cycle timer delay measuring unit.

2. The synchronizing system according to claim 1, wherein the request node includes a judging unit which determines if a series sequence from transmission of the Read packet until return of the ReadResponse packet is completed within one asynchronous transmission time zone, and when said judging unit determines completion within one asynchronous transmission time zone, a Read packet is sent out to the response node.

3. The synchronizing system according to claim 1, including an upper layer in the response node having a judging unit which identifies an asynchronous transmission time zone, and when said judging unit identifies an asynchronous transmission time zone, the upper layer accumulates the ReadResponse packet in a transmission buffer.

4. The synchronizing system according to claim 1, including a link layer in the response node having a writing unit which writes data into the packet immediately before sending out the packet, wherein just before the ReadResponse packet is sent out from the link layer buffer, the cycle time of the corresponding response node is written into the ReadResponse packet by said writing unit.

5. The synchronizing system according to claim 1, wherein each node has a cycle timer delay memory which stores the delay deviation amount.

6. The synchronizing system according to claim 5, wherein said cycle timer delay memory stores the delay deviation amount among all nodes in a data table format.

7. The synchronizing system according to claim 1, further comprising a network structure change judging unit which identifies a change in network structure, wherein, if said network structure change judging unit determines that a change has occurred in the network structure, after restructuring the network, said cycle timer delay measuring unit measures the mutual delay deviation amount of the cycle timers, and said cycle timer delay correcting unit corrects the mutual delay deviation of cycle timers based on the delay deviation amount.

8. A synchronizing system using an IEEE1394 serial bus for synchronizing among nodes in a network connected by the IEEE1394 serial bus, said synchronizing system comprising:
- a cycle timer delay measuring unit which measures mutual delay deviation amount of each cycle timer of each node;
- a cycle timer delay correcting unit which corrects mutual delay deviation of each cycle timer based on the delay deviation amount measured by said cycle timer delay measuring unit;
- a cycle timer delay transmission unit which transmits the delay deviation amount; and
- a node having a cycle master and including a reference cycle timer for synchronism and including said cycle timer delay measuring unit and said cycle timer delay transmission unit, wherein
  - a first node, other than said node having the cycle master, includes said cycle timer delay correcting unit, and
  - said node having the cycle master transmits the delay deviation amount measured to said first node, or stores the delay deviation amount measured in a data table,
  - said first node acquires the delay deviation amount measured from said node having the cycle master, and
  - the delay deviation of the cycle timer is corrected based on the delay deviation amount transmitted to said first node or the delay deviation amount acquired.

9. The synchronizing system according to claim 8, wherein said cycle timer delay correcting unit sets a cycle timer value based on the delay deviation amount when receiving a CycleStart packet.

10. The synchronizing system according to claim 8, wherein said cycle timer delay correcting unit corrects the delay deviation using the delay deviation amount when an upper layer uses a cycle timer value.

11. The synchronizing system according to claim 8, wherein said first node further includes a second cycle timer, and said cycle timer delay correcting unit sets the cycle timer value, having corrected the delay deviation using the delay deviation amount at an arbitrary time, in said second cycle timer.

12. The synchronizing system according to claim 8, wherein
- said node having the cycle master has a time stamp generating unit which generates a time stamp,
- said first node has a time stamp time monitoring unit which monitors time indicated by the time stamp,
- said cycle timer delay correcting unit updates the time stamp sent from said node having the cycle master based on the delay deviation amount, and
- said time stamp time monitoring unit monitors the time indicated by the time stamp after updating.

13. A synchronizing system using an IEEE1394 serial bus for synchronizing among nodes in a network connected by the IEEE1394 serial bus, said synchronizing system comprising:
- a cycle timer delay measuring unit which measures mutual delay deviation amount of each cycle timer of each node;
- a cycle timer delay correcting unit which corrects mutual delay deviation of each cycle timer based on the delay deviation amount measured by said cycle timer delay measuring unit;
- a cycle timer delay transmission unit which transmits the delay deviation amount; and
- a node having a cycle master and including said cycle timer delay correcting unit, wherein
  - a first node, other than said node having the cycle master, includes said cycle timer delay measuring unit and said cycle timer delay transmission unit, and
  - a specified node transmits the delay deviation amount measured by said first node to said node having the cycle master, or acquires the delay deviation amount from said first node, and the delay deviation of the cycle master of said node having the cycle master is corrected based on the delay deviation amount later transmitted to said first node or the delay deviation amount acquired.

14. The synchronizing system according to claim 13, wherein
- said node having the cycle master has a time stamp generating unit which generates a time stamp,
- said first node has a time stamp time monitoring unit which monitors time indicated by the time stamp, and
- said cycle timer delay correcting unit updates the time stamp generated by the time stamp generating unit based on the delay deviation amount.

* * * * *